(12) United States Patent
Thompson

(10) Patent No.: US 7,918,504 B2
(45) Date of Patent: Apr. 5, 2011

(54) SEATING FOR A PASSENGER VEHICLE

(75) Inventor: James Thompson, Kilkeel (GB)

(73) Assignee: J. Thompson Solutions Limited, Kilkeel, County Down (GB)

( * ) Notice: Subject to any disclaimer, the term of this patent is extended or adjusted under 35 U.S.C. 154(b) by 508 days.

(21) Appl. No.: 10/564,567

(22) PCT Filed: Jul. 15, 2004

(86) PCT No.: PCT/EP2004/008006
§ 371 (c)(1),
(2), (4) Date: Feb. 21, 2007

(87) PCT Pub. No.: WO2005/014395
PCT Pub. Date: Feb. 17, 2005

(65) Prior Publication Data
US 2007/0241232 A1  Oct. 18, 2007

(30) Foreign Application Priority Data
Jul. 17, 2003  (GB) ................................ 0316733.5

(51) Int. Cl.
*A47C 15/00* (2006.01)
(52) U.S. Cl. ....................................................... 297/248
(58) Field of Classification Search .................. 297/235, 297/243, 248, 249, 257
See application file for complete search history.

(56) References Cited

U.S. PATENT DOCUMENTS

| 3,446,530 | A | * | 5/1969 | Rowland | 297/239 |
| 5,992,798 | A | * | 11/1999 | Ferry | 244/118.6 |
| 6,059,364 | A | * | 5/2000 | Dryburgh et al. | 297/354.13 |
| 6,227,489 | B1 | * | 5/2001 | Kitamoto et al. | 244/118.5 |
| 7,025,306 | B2 | * | 4/2006 | Saint Jalmes | 244/118.6 |
| 7,252,332 | B2 | * | 8/2007 | Thompson | 297/248 |
| 2003/0218095 | A1 | | 11/2003 | Saint Jalmes | |

FOREIGN PATENT DOCUMENTS

| EP | 0 951 025 A2 | | 11/1999 |
| EP | 1 162 138 A2 | | 11/1999 |
| GB | 907472 | * | 10/1962 |
| WO | WO 00/21831 A2 | * | 4/2000 |
| WO | WO 03/053735 A1 | * | 7/2003 |

* cited by examiner

*Primary Examiner* — David Dunn
*Assistant Examiner* — Tania Abraham
(74) *Attorney, Agent, or Firm* — Porter, Wright, Morris & Arthur, LLP

(57) ABSTRACT

A seating arrangement for a passenger-carrying vehicle, especially aircraft. The arrangement provides a plurality of seating positions (P1, P2, P3), a seating position comprising a seat (20) and a footwell (22). The footwell (22) of a first seating position (P2, P3) is located beside the seat of a second seating position, the second seating position being located generally forward of the first seating position (P2, P3). Each seat is operable into a reclined state in which a leg-supporting component (30) of the seat projects into the associated footwell (22). The first seating position (P2, P3) and the second seating position (P1) overlap in a transverse direction.

52 Claims, 18 Drawing Sheets

SEATING FOR A PASSENGER VEHICLE

FIELD OF THE INVENTION

This invention relates to seating for a passenger vehicle. It has particular, but not exclusive, application to seating in a passenger carrying aircraft.

BACKGROUND TO THE INVENTION

There are clear economic incentives that drive aircraft designers to provide as many seats as possible in a passenger aircraft. Yet there is a conflicting demand to provide those passengers willing to pay for premium services with a feeling of space and privacy. In particular, business class and first class passengers on long air journeys may be offered seats that recline and can be converted into a bed. Such seats are very attractive to passengers because of the comfort that they offer. However, they are less attractive from the point of view of the aircraft operator because they represent an inefficient use of space within the aircraft.

Although embodiments of the invention will be described with respect to application to aircraft, it is not limited to such applications. It may, for example, find application in other forms of transport such as ships, hydrofoils, trains and coaches and so forth, as well as in other circumstances not related to transport.

SUMMARY OF THE INVENTION

Therefore, it would be desirable to provide a seating arrangement that can be used in passenger aircraft and in other circumstances that can provide an increase in passenger-carrying capacity without reducing (and maybe increasing) an occupant's perception of space.

From a first aspect, the invention provides a seating arrangement for a passenger-carrying vehicle, the arrangement providing a plurality of seating positions, a seating position comprising a seat and a footwell, the footwell of a first seating position being located beside the seat of a second seating position, the second seating position being located generally forward of the first seating position, wherein each seat is operable into a reclined state in which a leg-supporting component of the seat projects into the associated footwell, and wherein the first seating position and the second seating position overlap in a transverse direction.

The positioning of the footwell adjacent to a seat in front allows the seats to be arranged in rows having a pitch that is less than in a conventional arrangement. The overlap in the transverse direction partially counters the increase in transverse spacing between adjacent seats, the overall effect being to provide a passenger with more space per unit of floor area occupied than is possible in a conventional arrangement. For a given floor area, embodiments of the invention may allow up to 17% more seats to be provided than can a conventional arrangement.

In preferred embodiments, the second seating position overlaps the or each adjacent footwell in the transverse direction. This helps to further reduce the amount of space required in the transverse direction.

The invention has particular application to embodiments in which the seat can be reclined into a bed state to enable a user to sleep. Unlike in conventional "lie flat at an angle" reclining seats, the footwell does not need to fit below a seat, so its height can be sufficient to accommodate an occupier's feet while the occupier is fully reclined.

In a typical installation, an arrangement embodying the invention may include one or more groups in which seating positions are disposed in rows. For example, each row may be transverse to the normal direction of travel of the vehicle in which they are installed. Such groups may include rows having just one seating position. Alternatively or additionally, a group may have alternate rows having two and three seating positions respectively. In the latter case, most commonly found around the centre line of an aircraft passenger compartment a further advantage of embodiments of the invention becomes apparent. Most passengers can enter or leave their seat without disturbing any other passenger. Only occupiers within the central position of a three-seat row (or inner positions of longer rows) need disturb any other passenger, and a maximum of one other passenger need move for rows of three or four seating positions.

From a second aspect, this invention provides a seating component comprising a seat and a footwell, the footwell being located to laterally beside the seat. Such a seating component can be used in the provision of an arrangement embodying the first aspect of the invention and within a vehicle embodying the third aspect of the invention.

From a third aspect, this invention provides a passenger-carrying vehicle comprising a seating arrangement according to the first aspect of the invention. This aspect of the invention offers particular advantages where the passenger-carrying vehicle is an aircraft.

A seating component embodying the second aspect of the invention may include a shell. The shell most typically includes a recess that constitutes the footwell.

The shell most preferably is formed as a plastic moulding. In this way, it may be provided with additional functional formations. For example, it typically includes a region to enclose a back of the seat and to enclose operating components of the seat. The shell may also include a formation (amongst other possibilities) that serves as an armrest, a tray, a table, a support for a display monitor and a holder for literature. Where a tray and/or a table is provided by a formation of the shell, it may not be necessary to provide an in-arm table. This allows the space provided to the passenger to be maximised with respect to the overall width of the seating component.

A seating component embodying this aspect of the invention may provide one, two, three or more seating positions. Embodiments that provide one seating position typically have one seat and one footwell. Embodiments that provide two seating positions may include three footwells, and these may be used in alternate rows with seating components that provide three seating positions and two footwells.

The seat provided in embodiments of the invention is movable between an upright position and a reclined position. In the reclined position, the seat may provide a substantially flat sleeping platform. This is advantageously disposed horizontal or at a shallow angle, such as a few degrees (e.g. 2°) from horizontal when in normal use. Note that an aircraft normally flies with its nose slightly high such that the floor is a few degrees (say, 3°) from horizontal. Therefore, to obtain a substantially level bed in normal flight, the sleeping platform must slope downwardly with respect to the floor in a forward direction.

From another aspect, the invention provides a seating arrangement for a passenger-carrying vehicle, the arrangement providing a plurality of sleeping compartments, a sleeping compartment comprising a footwell and a sleeping surface projecting into the footwell, the footwell of a first sleeping compartment being located beside the sleeping surface of a second sleeping compartment, the second sleeping compartment being located generally forward of the first sleeping compartment, wherein the first sleeping compartment and the second sleeping compartment overlap in a transverse direction.

Other preferred features of the invention are recited in the dependent claims provided herewith. The preferred features as described herein or as described by the dependent claims filed herewith may be combined as appropriate, and may be combined with any of the aspects of the invention as described herein above or by the independent claims filed herewith, as would be apparent to those skilled in the art.

Further advantageous aspects of the invention will become apparent to those skilled in the art upon review of the following description of a specific embodiment of the invention and with reference to the accompanying drawings.

BRIEF DESCRIPTION OF THE DRAWINGS

Embodiments of the invention will now be described in detail, by way of example, and with reference to the accompanying drawings, in which.

DETAILED DESCRIPTION OF THE DRAWINGS

Figure 1:
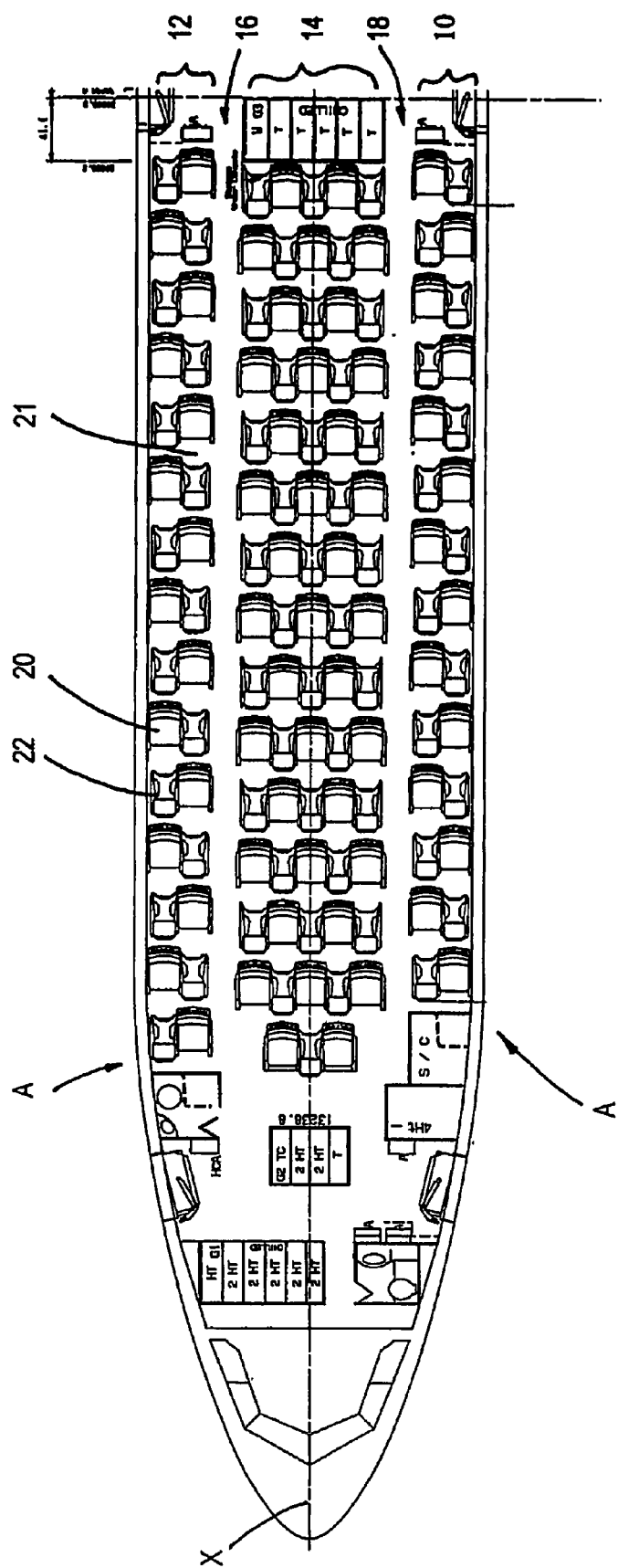
FIG. 1 is a seating plan showing a seating arrangement in Zone A of an Airbus A340-600 aircraft.
Figure 2:
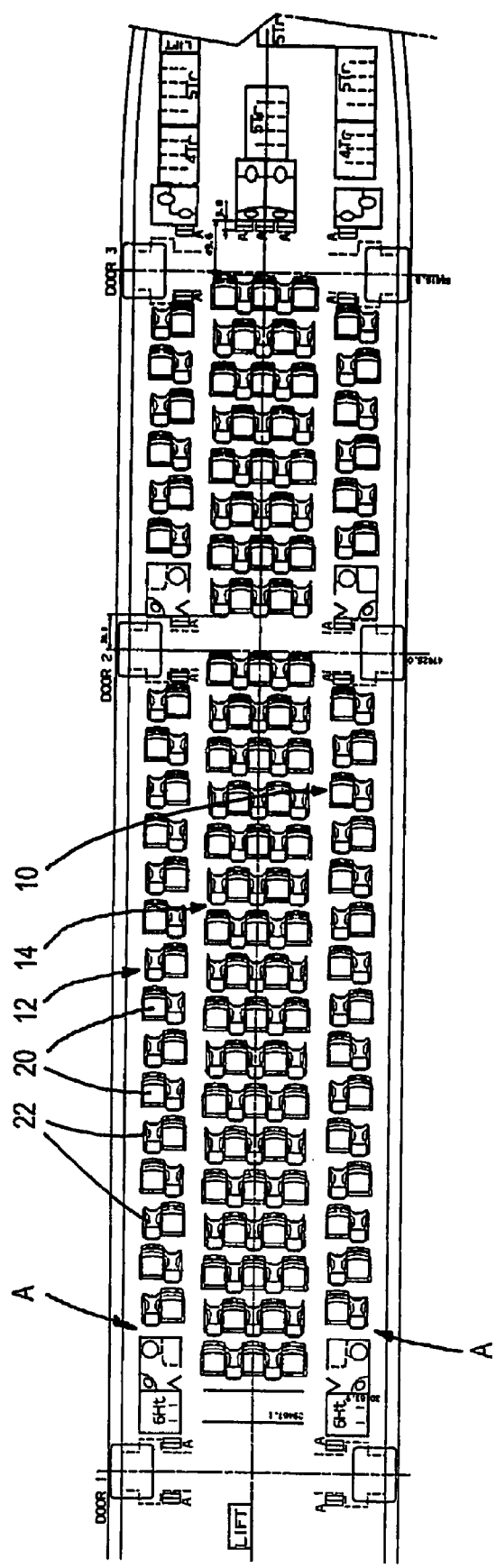
FIG. 2 is a seating plan showing a seating arrangement in Zones B and C of an Airbus A380 aircraft.

As shown in FIG. 1, seating Zone A in an Airbus A340-600 (r. t. m.) aircraft is provided with a total of fifty-nine seating positions. As shown in FIG. 2, seating Zones B and C of an Airbus A380 (r. t. m.) aircraft are provided respectively with seventy-three and thirty-two seating positions. Much of the following description applies to both of these embodiments, although it will be understood that the invention is not limited to any specific aircraft or aircraft layout.

The seats are arranged in three groups, two outer groups 10, 12 and an inner group 14, separated by two aisles 16, 18. Within each group, the seats are arranged in rows that extend generally transversely of the principal longitudinal axis X of the aircraft, the rows being generally parallel with one another. In a preferred embodiment, the rows are spaced with a pitch of approximately 1016 mm (40 inches). Thus, the outer group 10 of fourteen seats in the embodiment of FIG. 1 has an overall length of approximately 13208 mm (520 inches). Within each outer group 10, 12, each row includes one seating position. In the inner group 14, the rows include alternately two seating positions and three seating positions.

The immediately following description applies to a typical seating position within a group. Seating positions at the front row and rear row of each group differ, and will be described separately below.

Each seating position includes a forward-facing seat 20 and an associated footwell 22. Within the row, each seat 20 is disposed, in a transverse direction (i.e. generally perpendicular to the longitudinal axis X of the aircraft), adjacent to, or beside, a footwell 22 associated with a seating position of the row immediately behind. Hence, adjacent seating positions are displaced or staggered, but overlapping, with respect to one another in the fore-and-aft direction. The fore-and-aft direction runs forwards and rearwards generally along or parallel with the longitudinal axis of the aircraft. The "forward" direction is the direction in which the seats 20, and therefore seated passengers, face and is typically the same as the direction of travel of the aircraft during flight (and generally parallel with the longitudinal axis of the aircraft), although it need not necessarily be so. The seats 20 in successive rows are staggered, or displaced with respect to one another, in a lateral or transverse direction (i.e. across the aircraft, or other vehicle, substantially perpendicular to the forward direction) so that the footwell 22 adjacent a given seat 20 is associated with a seat 20 in the row behind and may be used by the occupier of a seat in the row behind. Moreover, as is described in more detail hereinafter, a given seating position overlaps in the transverse direction with the nearest seating position in front and or behind. The arrangement is such that at least the respective armrests of the seating positions overlap in the transverse direction. As can best be appreciated from FIGS. 4 and 13, when the seats 20 are reclined into a bed or sleeping state, at least a respective shoulder and/or arm-receiving region of adjacent seating positions (or sleeping compartments) overlap in the transverse direction.

Figure 3:
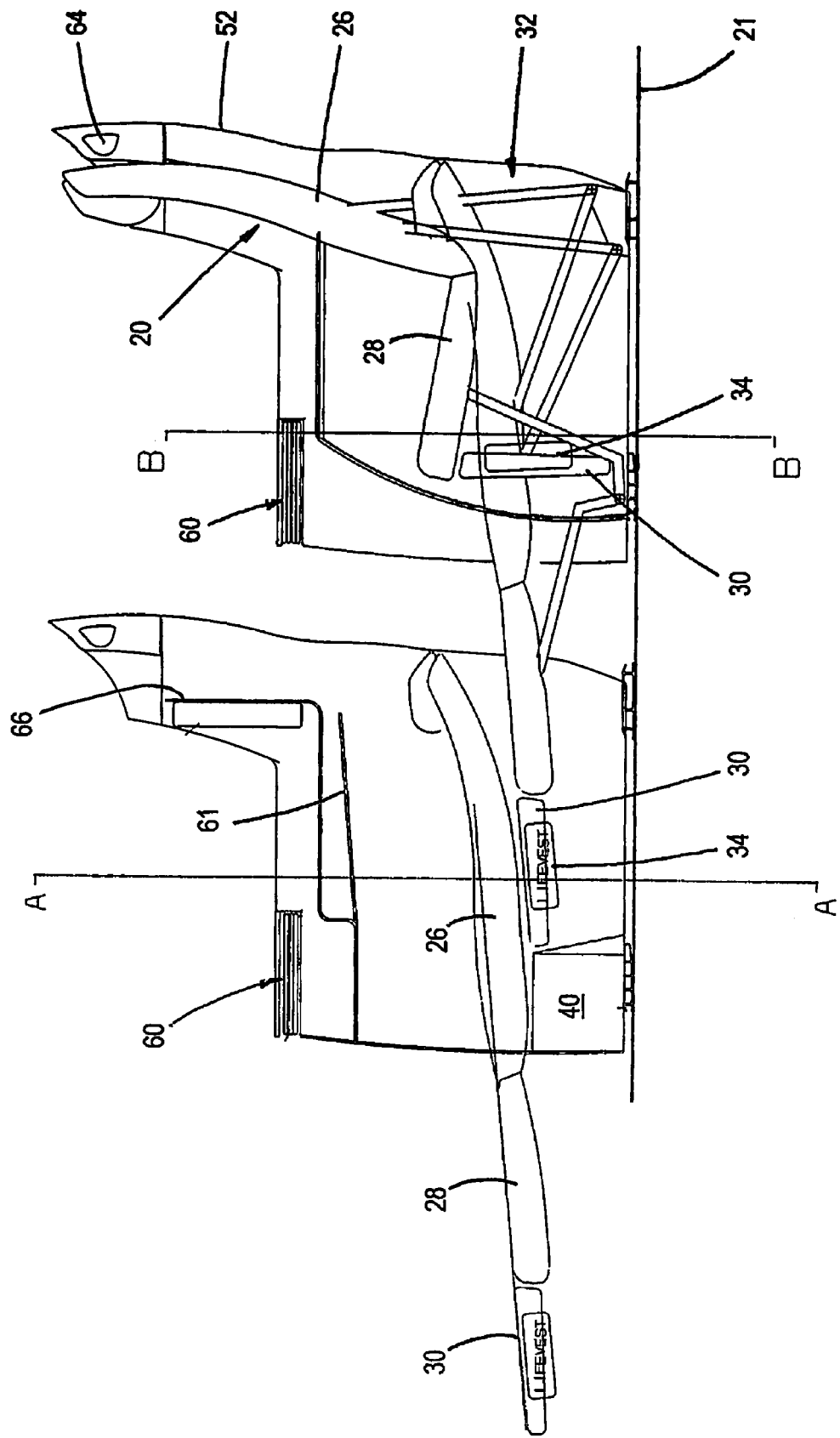
FIG. 3 is a transverse detailed view of seats in the embodiments of FIG. 1 and FIG. 2 in an upright and a reclined position.

As shown in FIG. 3, each seat 20 can adopt a range of positions, from an upright position, or state, to a fully reclined, or bed, position, or state, (both being shown in FIG. 3). The seat comprises a backrest or back 26 and a seat base or pan 28 (typically comprising a seat squab) that form the back and base, respectively, of the seat when in the upright position. The seat further includes a leg support component or pad 30. In the upright position, the leg support pad 30 extends, out of use, downwardly (i.e. generally towards the ground surface or floor 21 of the aircraft) from a front edge region of the squab 28. The back 26 is pivotable with respect to the squab 28 to allow the seat 20 to adopt the upright state and the bed state. Similarly, the leg support 30 is pivotable with respect to the squab 28. Conveniently, a life jacket 34 can be carried on the leg support pad 30 beneath the squab 28.

The back 26, squab 28 and leg support pad 30 are carried on a linkage 32. The linkage 32 serves to control movement of the components carried upon it as the seat moves between its upright and reclined positions, the movement being driven by an electric, or other, motor (not shown). In the embodiment of FIG. 3, the back 26 of the seat 20 does not move (or moves only minimally) rearwards as the seat 20 moves from its upright to its reclined position, i.e. the seat 20 moves generally forwardly from the upright state to the reclined state, and generally rearwardly when moving from the reclined state to the upright state. Movement to the reclined position is achieved by a generally downward (i.e. generally towards the aircraft floor) and generally forward pivoting movement of the back 26, a predominantly forward movement of the squab 28, and a generally upward (i.e. away from the floor) pivoting movement of the leg support pad 30. When reclined, the back 26, squab 28 and leg support pad 30 form an approximately flat sleeping platform which, in the preferred embodiment, is of length approximately 1880 mm (74 inches) and is angled at a few degrees (say, 2°) from the horizontal while the aircraft is in normal level flight. (This is achieved by its being at an angle of approximately 5° to the floor.) In such a position, the leg support pad 30 extends into the associated footwell 22. In general, it is desirable to provide a sleeping platform that is as close to horizontal as possible.

The linkage 32 may for example comprise one or more linkage members or bars 33 pivotably coupled to the floor 21 and to the back 26, and one or more linkage members or bars 35 pivotable coupled to the floor and to the squab 28. One or more of the linkage bars 33, 35 may be driven by the motor.

Figure 7:
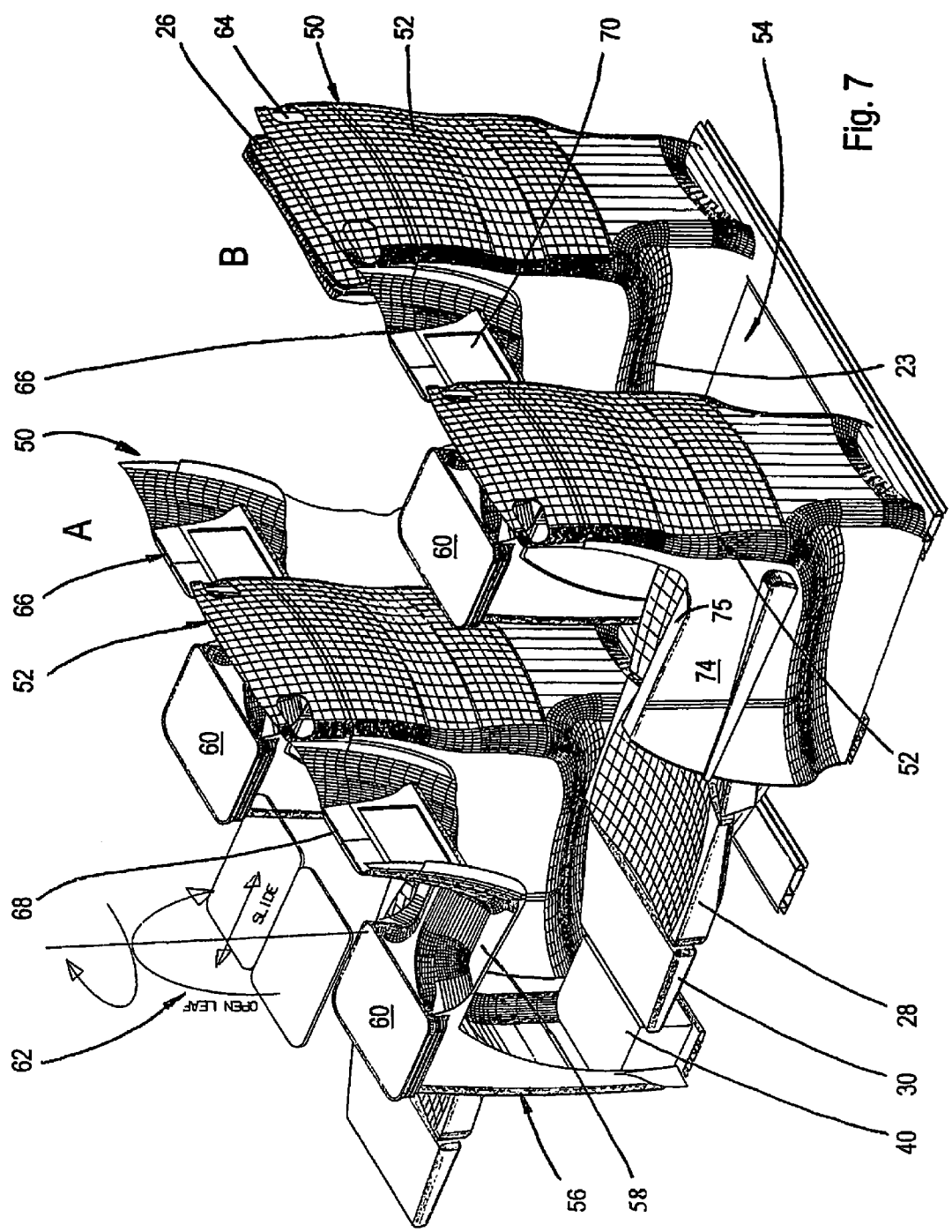
FIG. 7 and FIG. 8 are part cut-away, perspective views of seats in the embodiments of FIG. 1 and FIG. 2 showing seats in both upright and reclined positions.
Figure 8:
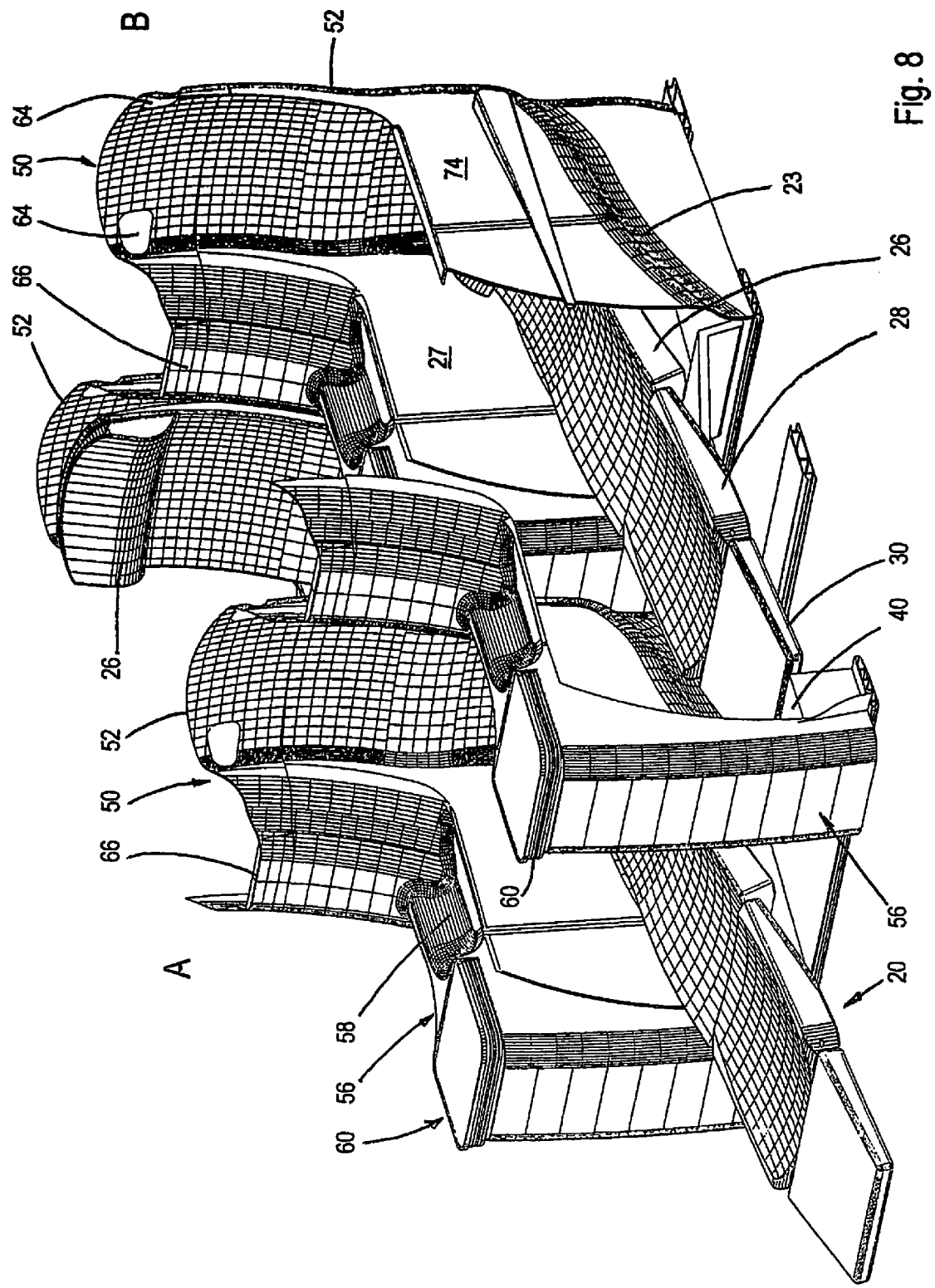

As may best be seen from FIGS. 7 and 8, within the footwell 22 there is advantageously a platform 40 having an upper surface that is generally parallel to the floor of the aircraft at a height of, for example, approximately 183 mm (7.2 inches) and width of, for example, approximately 307 mm (12.1 inches). When the seat 20 is in the reclined position, an edge of the leg support pad 30 that is furthest from the squab 28 is adjacent to and substantially level with the platform 40, such that the platform can serve as an extension of the sleeping platform that is provided by the reclined seat. This can be used to provide a sleeping platform that is longer than that which could be provided by components of the seat alone.

Figure 4:
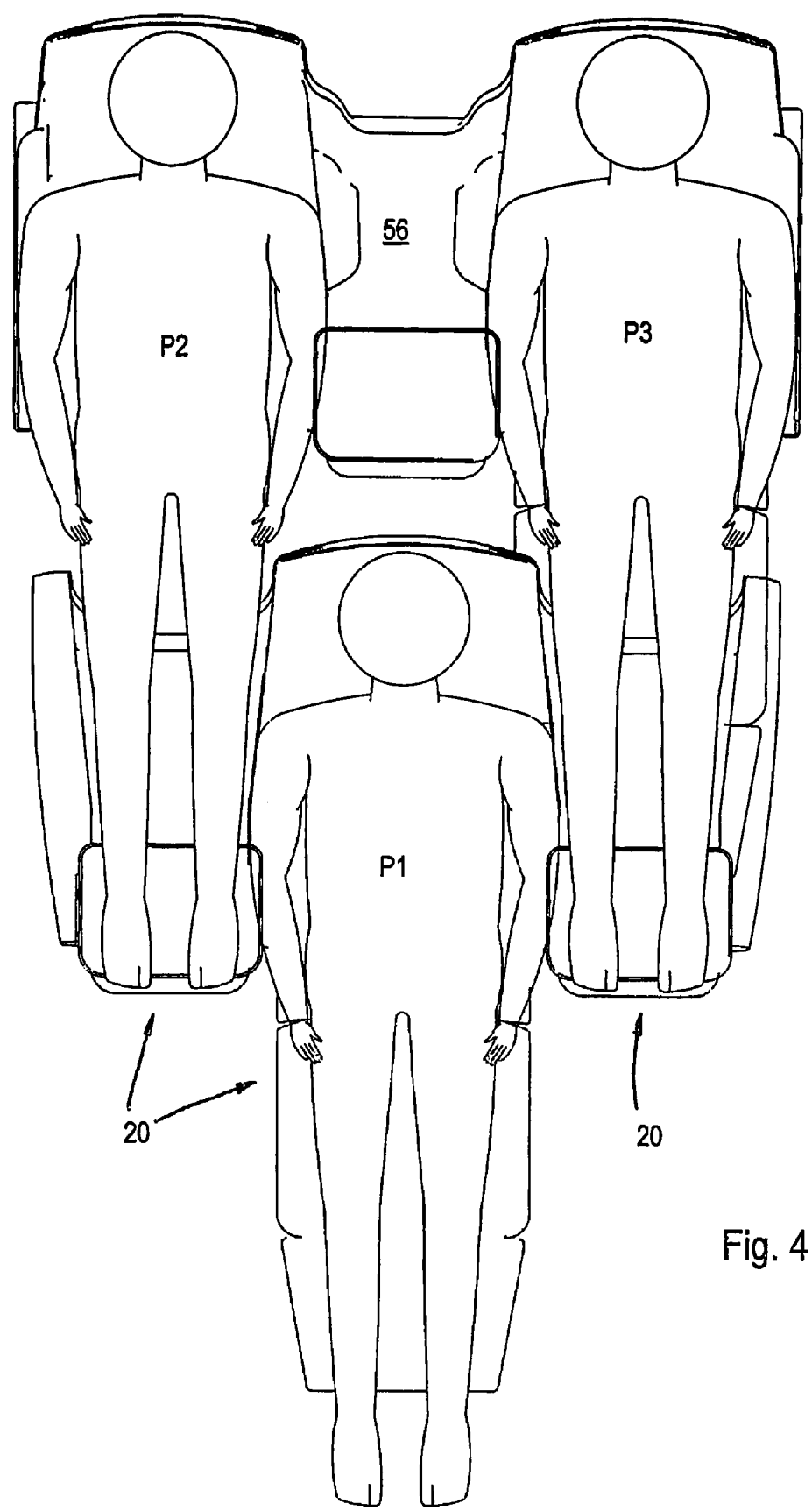
FIG. 4 is a detailed plan view of seats in the embodiments of FIG. 1 and FIG. 2 showing them occupied when in the reclined position.
Figure 13:
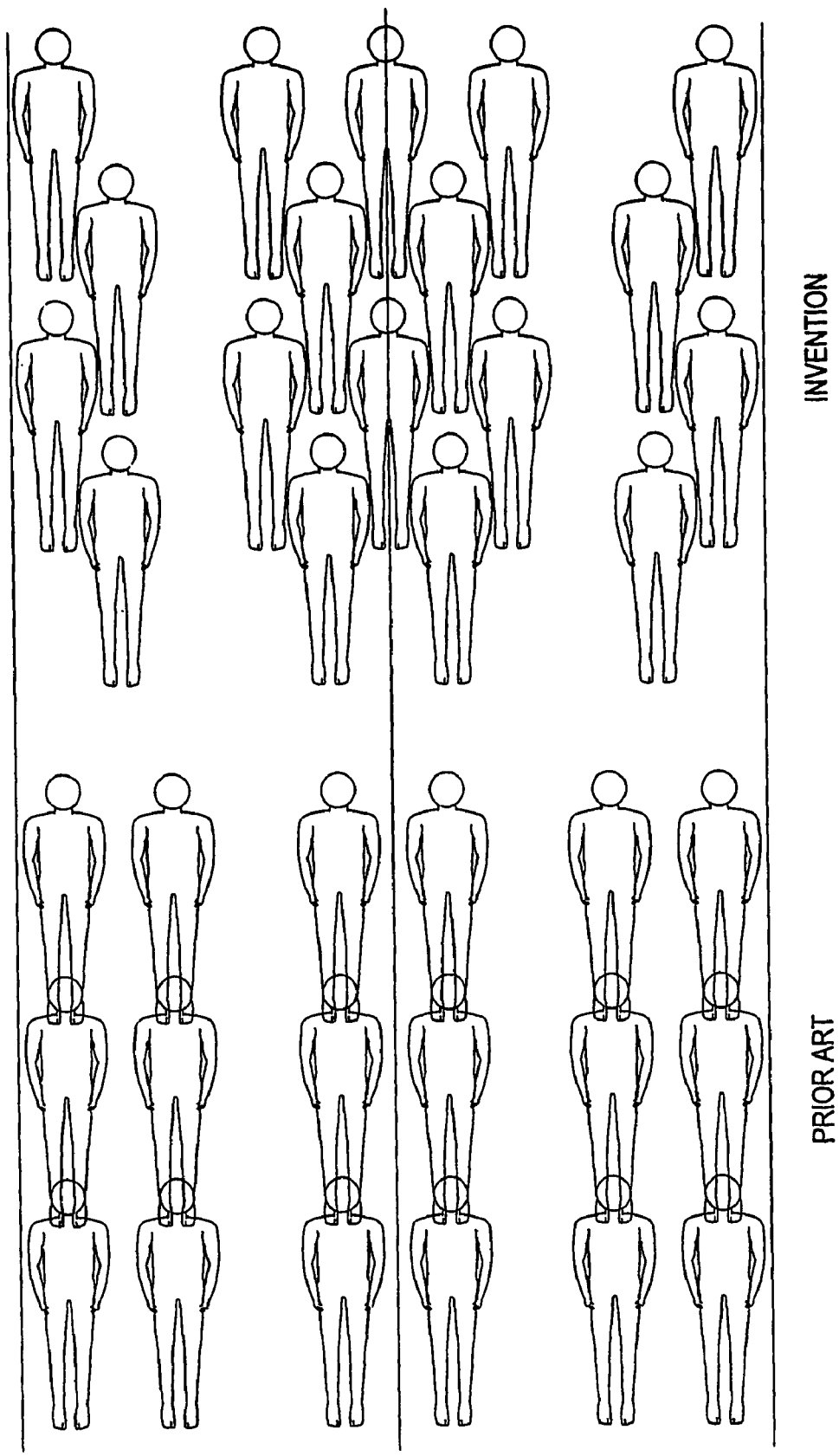
FIG. 13 is a plan view that serves to compare a conventional seating arrangement with one embodying this invention.

FIG. 4 shows three typical seating positions (shown with the respective seats in the reclined state) of the seating arrangement described above occupied by passengers. The torso and head of a person (identified as P1 in FIG. 4) occupying a seat in a first row is adjacent to the legs of passengers (P2, P3) in an immediately rearward row. The width of the footwell 22 is less than the width of the seat 20. The seat of the occupant P1 and the seats of the occupants P2, P3 overlap in said transverse direction (i.e. the lateral direction generally perpendicular with the forward direction). In particular, it will be seen that the respective regions for receiving the shoulders and arms of the seat occupants are overlapping in the transverse direction. In the preferred embodiment, the respective seat backs 26 overlap in the transverse direction. In the preferred embodiment, the footwells 22 are shaped to become generally narrower in said forward direction (and preferably in a gradual manner). Hence, the respective seat stations 19 (i.e. the respective area in which each seat is located) become correspondingly wider in said forward direction. This allows a more efficient use of space than is possible with seating arranged conventionally in transverse rows. (A comparison of an embodiment of the invention and a conventional arrangement is shown in FIG. 13.)

When the respective seats 20 are in the reclined state, the respective seating positions provide a respective sleeping compartment, each sleeping compartment including the respective footwell 22 and a sleeping surface projecting into the footwell, the sleeping surface being provided at least partly by the respective seat 20 when in the reclined state. As may best be appreciated from FIG. 4, adjacent sleeping compartments (e.g. the respective compartments for passengers P2 and P1 or for passengers P1 and P3) overlap in the transverse direction. In some embodiments, the sleeping surface may be entirely provided by the respective reclined seat 20. In other embodiments, the sleeping surfaces are provided mainly by the respective seats 20 although the sleeping compartment may also comprise one or more regions for receiving the passenger's shoulders and/or arms that may be separate from the seat 20 itself. In the preferred embodiment, adjacent sleeping surfaces overlap in the transverse direction.

Figure 5:
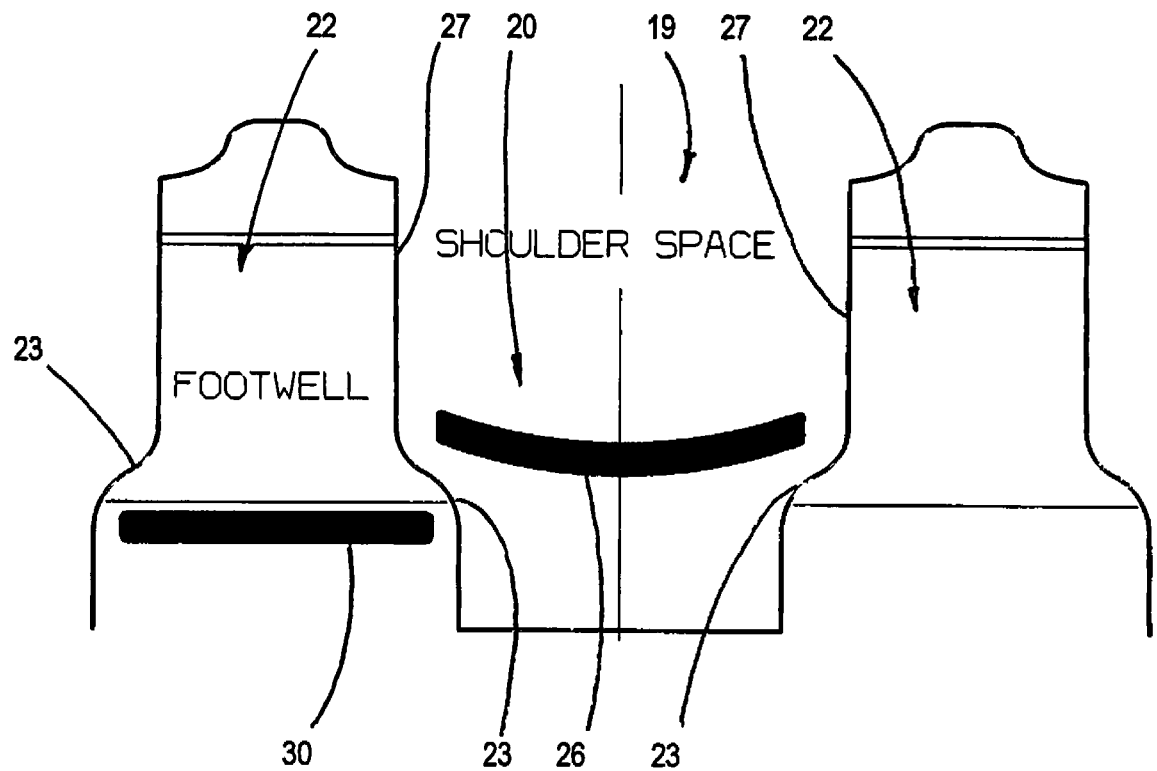
FIG. 5 and FIG. 6 are cross-sectional views on, respectively, lines A-A and B-B of FIG. 3.
Figure 6:
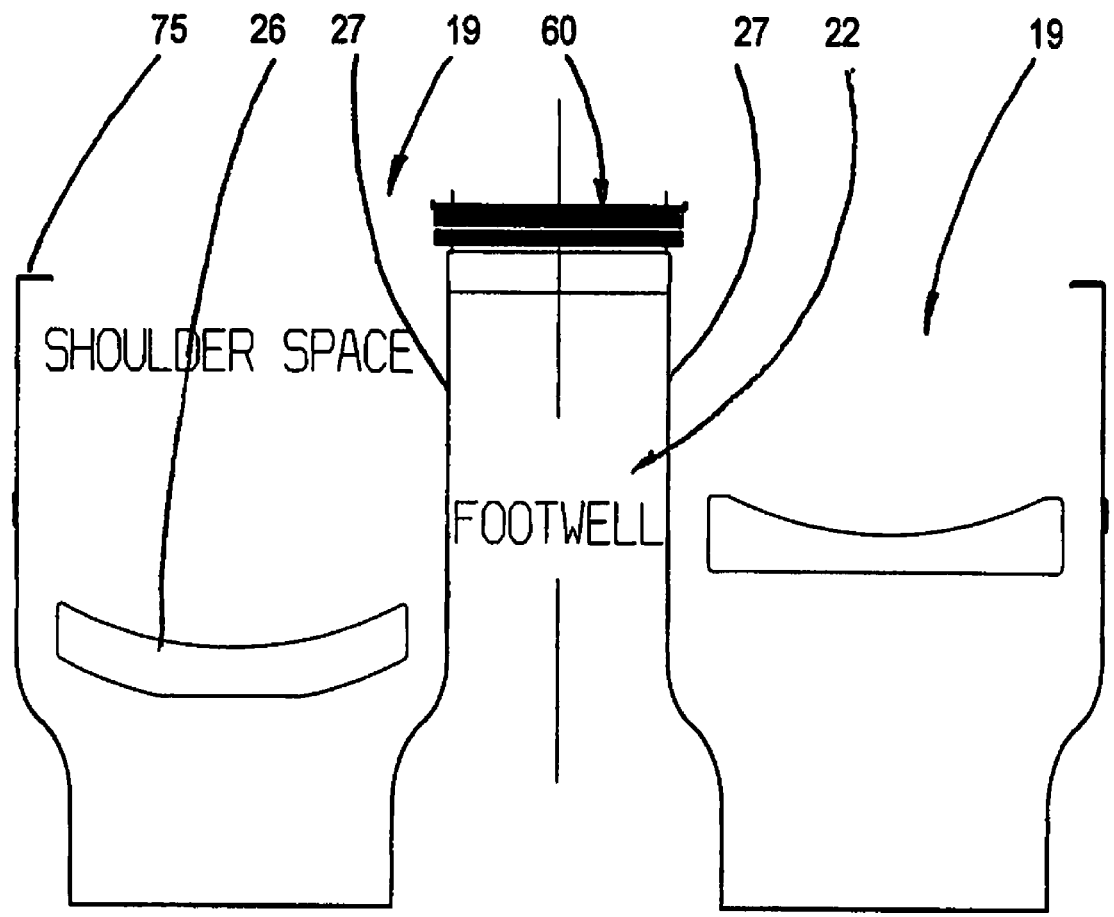

The preferred shapes and dimensions of the seating positions in this seating arrangement are shown in detail in FIGS. 5 and 6, each of which shows a sectional view taken in a generally transverse plane, i.e. a plane that is generally perpendicular to the forward direction. In FIG. 5, the back 26 of one seat (in the reclined position) is shown alongside the leg support pad 30 (also in the reclined position) of an immediately rearward seat 30. It will be seen that the seat station 19 for seat 20 overlaps with the adjacent footwells 22 in the transverse direction. Moreover, it will be seen that a portion or region of the seat station 19 protrudes or projects over part of the adjacent footwell 22 with respect to the floor 21. Hence, part of the footwell 22 is located beneath the seat station 19. It may therefore be said that the seat station 19, and in particular the region of the seat station 19 that receives a passenger's arms and/or shoulders (especially in the reclined or sleeping position) overhangs part of the or each adjacent footwells 22. The region of overlap caused by the overhanging portion of the seat station 19 extends in both the transverse and longitudinal directions and so the seat station 19 and footwell(s) 22 have a respective portion or region which share a common, or overlapping, area extending in both the transverse and longitudinal direction.

The respective seats 20 of the seat positions may also overlap or overhang said footwells 22 in the manner described above. Hence, the footwells 22 become generally narrower in a direction generally upwardly, or away, from the floor 21. Preferably, the narrowing of the footwells 22 in this direction is effected by the provision of an inflected portion 23 in a respective dividing panel 27 between the seat station and adjacent footwell(s) 22. As illustrated, the dividing panel 27 may extend generally perpendicular to the floor on either side of the inflected portion 23. Advantageously, the inflected portion 23 is provided below the level of the back 26 when in the reclined state and above the level of the leg-support pad 30 when in the reclined state. The arrangement described above also provides a particularly efficient use of space and allows seats 20 to be located relatively close to one another in the transverse direction while still providing sufficient space for passengers. In the preferred embodiment, the shoulders and/or arms of a passenger when fully reclined overlap, or overhang, with the leg support component 30 of the seat 20 behind.

In a preferred embodiment, the width of the space that is provided for each passenger in the reclined seat at shoulder height is approximately 602 mm (23.7 inches). Within the footwell, the width is approximately 307 mm (12.1 inches). The depth of the footwell is approximately 360 mm (14.2 inches). Also illustrated in these drawings are possible locations for the seat electric box (SEB) and the in-flight entertainment box (IFE).

Further details of the implementation of the invention will now be described.

Four distinct types of seating components are provided in each embodiment. Within the inner group 14, alternate rows have two seats (and three footwells) and three seats (and two footwells). An end part of each type of row is shown in FIGS. 7 and 8 generally indicated at A and B, respectively. Within the outer groups 10, 12, each row has one seat. Alternate rows have the seat to the left (looking forward) and to the right of the footwell of the row behind. The construction of each of these assemblies is similar, and will now be described.

In the preferred embodiment, each seating component or assembly comprises a shell 50 shaped to define the respective station 19 for one or more seats 20 and to define a respective footwell 22 on one or both sides of the or each seat station 19. Each seating row may be provided by a single shell 50. In the preferred embodiment, the shell 50 is shaped so that the or each seat station 19 overlaps with the or each adjacent footwell 22 in the transverse direction. In the preferred embodiment, the shell 50 is shaped so that the or each seat station 19 overhangs part of the or each adjacent footwell 22 in the manner described above with reference to FIGS. 5 and 6 (in which case the shell 50 provides the respective dividing panels 27). The shell 50 is preferably shaped so that the seat stations 19 become wider, and the footwells 22 become correspondingly narrower, in the forward direction. Each shell 50 may comprise a moulded plastics shell 50. Preferably, the shell 50 has one or more formations that constitute several functional components.

First, the shell 50 has a respective upright concave (to the front) region 52 for each seat—thus, each shell 50 may have one, two, three or more such regions. Each concave region 52, which forms part of the respective seat station 19, may have an aperture 64 formed through it at an upper part. In this embodiment, two such apertures 64 are provided on each concave region. Such an aperture 64 can be used as a handhold by passengers walking in the aisles or while gaining access to or exiting from the seat, and they can also contribute to the aesthetic design of the seating components. The upright concave region 52 covers the rear of the seat back 26 when it is in its upright position, and extends downwardly to enclose the linkage 32 and the motor.

When viewed from the front, the shell 50 has a forwardly-projecting abutment or buttress portion 56 between adjacent seat stations 19, or adjacent single seat stations 19. The buttress portion 56 provides a console and may, for example, have a generally rectangular cross-section. The buttress portion 56 extends adjacent to the seat pan or squab 28 of the seat 20 when it is in the upright position. An upper surface of the buttress, which in the preferred embodiment is at a height approximately 729 mm (28.7 inches) above the floor level, preferably has a longitudinally extending concave formation 58 adjacent to each of the seats 20. Each concave formation 58 provides an armrest for a person in the adjacent seat when it is upright. The armrests 58 overlap or overhang the footwell 22 defined below.

At its forward extent, the buttress 56 comprises a stowage area which, in the preferred embodiment, comprises a generally flat-topped region 57. This flat-topped region 57 carries or stows a tray or tray assembly 60 when not in use. The tray assembly 60 can provide a relatively small tray surface when disposed in a folded position upon the buttress 56 (as shown in FIG. 8). Alternatively, a separate table may be provided for this purpose, the tray 60 being stowed beneath the separate table. Preferably, the tray assembly 60 comprises one or more (preferably two) tray portions or leaves 60 that can be deployed or folded out generally across the adjacent seat 20 (see 62 in FIG. 7). This provides a larger tray surface, approximately 698 mm (27.5 inches) above floor level for example, for serving a meal. The tray or tray assembly 60 may therefore be stowed adjacent its associated seat and, moreover, when stowed, is disposed generally parallel with the floor 21. This is in contrast to conventional trays of business class and first class seating which are stowed in the seat's armrest and are disposed generally perpendicularly to the floor. It is found that, in typical embodiments, by stowing the tables or trays 60 in the manner described above, each seat station 19 may be approximately 75 to 100 mm (3 to 4 inches) wider than would be possible using a conventional tray stowage arrangement. The configuration of the tray assembly 60 and its deployment mechanism may take a variety of forms. In the preferred two-leaf embodiment, the leaves a hinged to one another along a respective edge in a generally book-like manner, one leaf being pivotably connected to the buttress 56 for rotation about an axis that is generally perpendicular to the floor 21. Said one leaf is also slidably connected to the buttress 56 in the fore-and aft direction.

As may best be seen from FIGS. 1 and 2, in the preferred embodiment, the buttress 56, and therefore the associated footwell 22, projects beyond the foremost edge of the seat pan 28 (when upright) in the forward direction. In the preferred embodiment, the buttress 56 projects beyond the seat pan 28 by approximately 150 to 200 mm (6 to 8 inches). This allows the pitch between rows to be relatively small while still providing enough space to allow the seat, and occupying passenger, to recline fully in a substantially horizontal position. By way of example, an egress space of approximately 216 mm (8.5 inches) is provided between the front of each buttress 56 and the rear of the shell 50 in front. Since the shell 50, and in particular the rear of the shell 50 is fixed, the egress between rows is constant and is not compromised when the seats of the forward row are reclined. From another perspective, each seat 20 may move between its upright and reclined state in a fixed spaced defined by the fixed shell 50 that defines its associated seat station 19 and by the fixed shell 50 of the seat(s) in front. Accordingly, movement of the sets between the upright and reclined states dose not affect the passengers in the rows in front or behind. In an alternative embodiment (not illustrated), the rear of the shell may recline rearwardly to accommodate a seat whose back reclines rearwardly.

When viewed from the rear, the buttress 56 presents a forwardly extending recess 54 that opens rearwardly. The recess 54 provides the footwell 22 for a seating position to the rear. The height of the footwell 22 above the floor 21 is determined by the height of the upper surface of the buttress 56 and is sufficiently high to receive the legs of a passenger on a seat in the fully reclined position. A generally flat support member 61 (FIG. 3) may extend transversely across an upper part of the recess 54 to form a storage pocket, taking the place of the pocket that is normally provided on the back of a conventional aircraft seat. The support member, which may be rigid or flexible, advantageously slopes downwards in a forward direction with respect to the floor at an angle of a few degrees. This is to resist the tendency of articles to fall from the storage pocket while the aircraft is accelerating for takeoff or when climbing.

An upright shell or web portion 66 of the shell 50 extends between adjacent concave portions 52. A corresponding upright portion 68 extends adjacent to the concave portion 52 of the one-seat seating assemblies and outwardly from outer sides of the concave regions 52 of the two-seat seating assemblies. Each such upright portion 66, 68 includes a generally flat portion 71 extending in a generally transverse direction and positioned generally in front of a respective seat 20 in the row behind. It can therefore be used to carry a display screen, or monitor 70 in a position that can be conveniently viewed by an occupier of that seat. The upright portions 66, 68 project forwardly of the concave regions 52 (and may be said to be convex to the forward direction) to define a wall or screen 69 between adjacent seat stations 19. The screen 69 preferably extends from the buttress 56 to a level substantially at or adjacent the, in use, upper edge of the back rest 26 when in the upright state, and may extends only part way along the buttress 56 in the forward direction. The screen 69 improves the privacy of occupants in adjacent seats.

Adjacent to each aisle 16, 18, the shell 50 has a forwardly extending arm portion or panel 74 that is generally disposed in a plane generally parallel with the forward direction and that extends beside the squab 28 of the seat 20 when in the upright position. An upper surface of the arm portion 74 is formed as a lip or shelf 75 that turns in above, or overhangs, the seat squab 28 (when in the upright state) to serve as an armrest. The armrest 75 is generally planar in form and is disposed in a plane generally parallel with the seat pan 28 (when upright). Hence, the seat station 19 comprises a space beneath the armrest 75. In consequence, the width of the squab 28 can be greater than the distance between the arms. For example, the squab may be 570 mm (23.5 inches) wide, while the distance between the arms may be 554 mm (21.8 inches). Moreover, there is no in-arm table to add to the width of the seat/seat station.

This provides the occupier of the seat with width where they benefit it most—in the region of their hips when seated and shoulders and/or arms when sleeping—and provides adequate, but reduced, width where it is less important—in the footwell when the seat is reclined. As compared with a conventional arrangement, each passenger occupies less floor space, yet the transverse distance between each passenger is greater (for example, up from 150 mm to 254 mm (6 inches to 10 inches), giving the passenger an increased perception of space). The shell 50 also provides the occupier with a personal enclosed space, this further contributing to a feeling of comfort.

By way of example, the overall width of a single seat 20 and two adjacent footwells 22 in this embodiment is approximately 1458 mm (57.4 inches), and a double seat with a single intermediate footwell is approximately 1532 mm (60.3 inches). A single seat 20 and footwell 22 component has an overall width of approximately 952 mm (37.5 inches).

Special measures may be taken at the front and rear ends of each group of seats to optimise the use of space.

Figure 9:
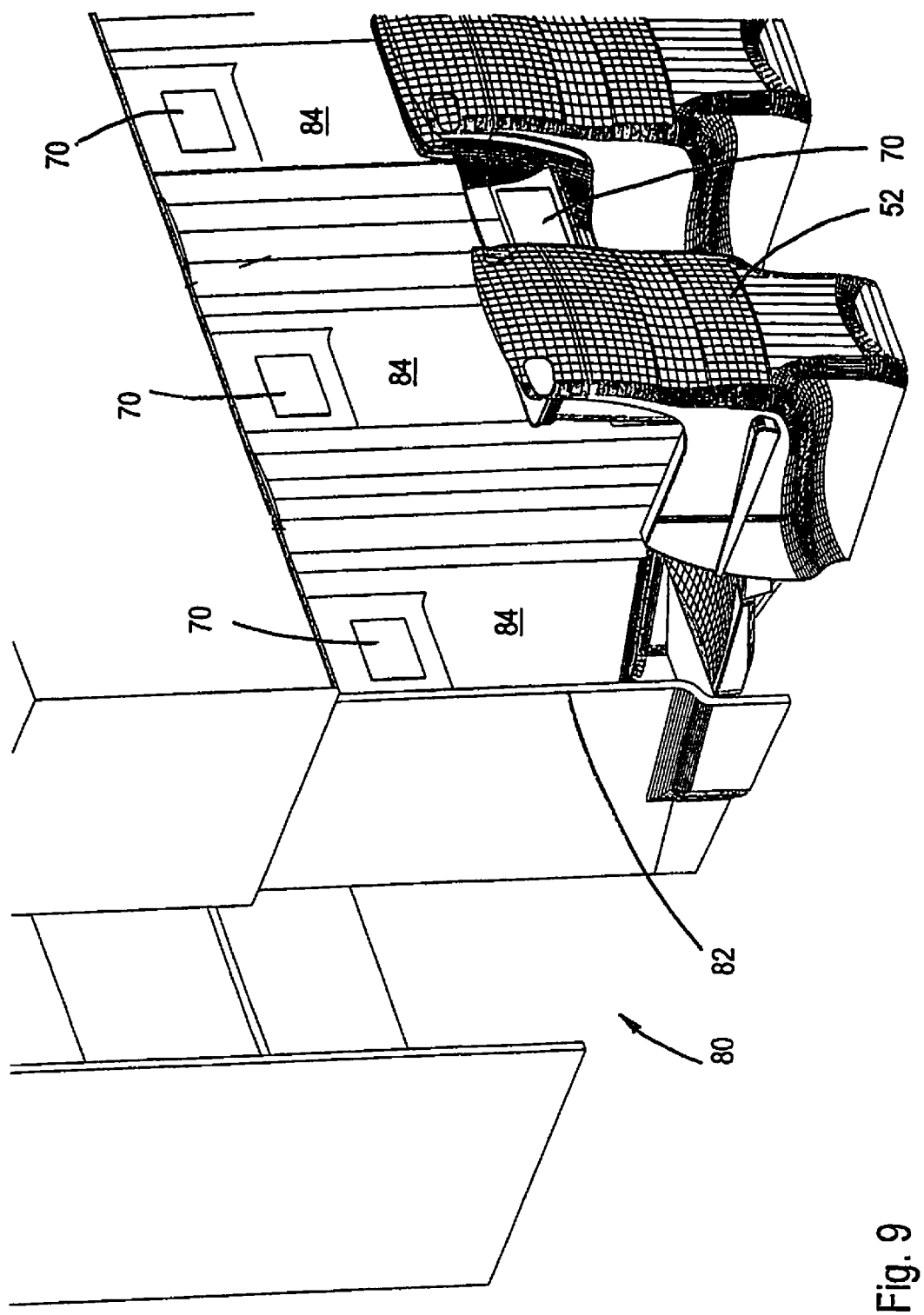
FIG. 9 illustrates an arrangement of seating in the embodiment of FIG. 1 or FIG. 2 in the region of a cooking galley.

FIG. 9 shows an arrangement that can provide an efficient arrangement for a block or group of seats that ends immediately to the rear of a transverse galley 80. This is not required in the arrangements shown in FIGS. 1 or 2, but may be applicable to installations embodying the invention in other aircraft. The galley 80 has a rear bulkhead wall 82. The aim of the arrangement provided in embodiments of the invention is to minimise the clear distance that must be left between the bulkhead 82 and the first row of seats adjacent thereto.

In order to provide a footwell for each of the seats in the front row, a respective recess 84 is formed in the bulkhead 82 in front of each seat. The recess 84 may be of dimensions similar to the footwell recesses described above. Within the galley 80, there is a projecting abutment corresponding to each recess 84. A display monitor 70 can be mounted on the bulkhead above the recess 84.

To minimise the intrusion into the galley space, regions between adjacent recesses 84 can be used to store galley trolleys, and the space above the abutments can be used as a genera purpose storage space, including, for example, stowage cupboards.

Figure 10:
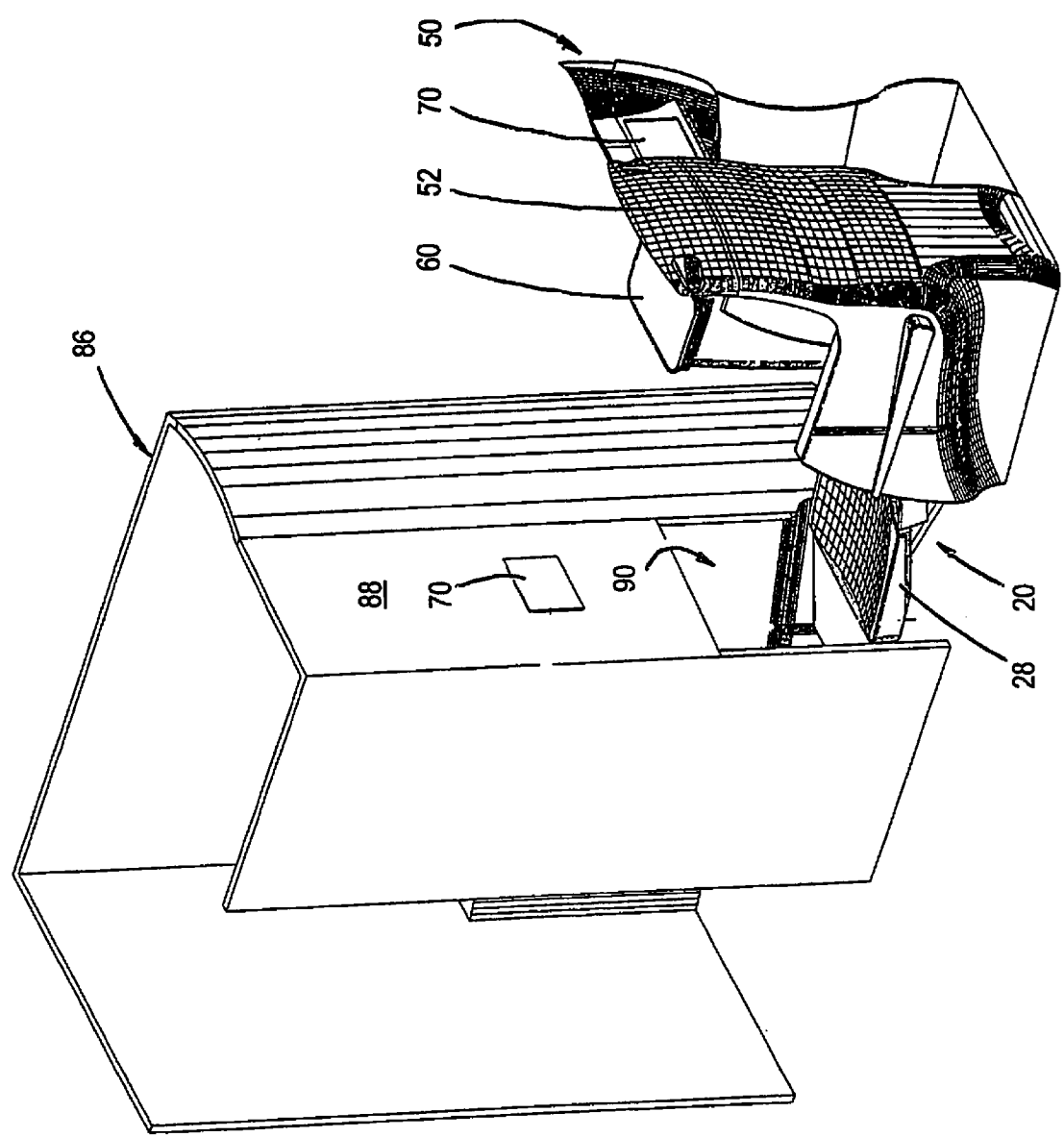
FIGS. 10, 11 and 12 illustrates an arrangement of seating in the embodiment of FIG. 1 or FIG. 2 in the region of a lavatory enclosure.
Figure 11:
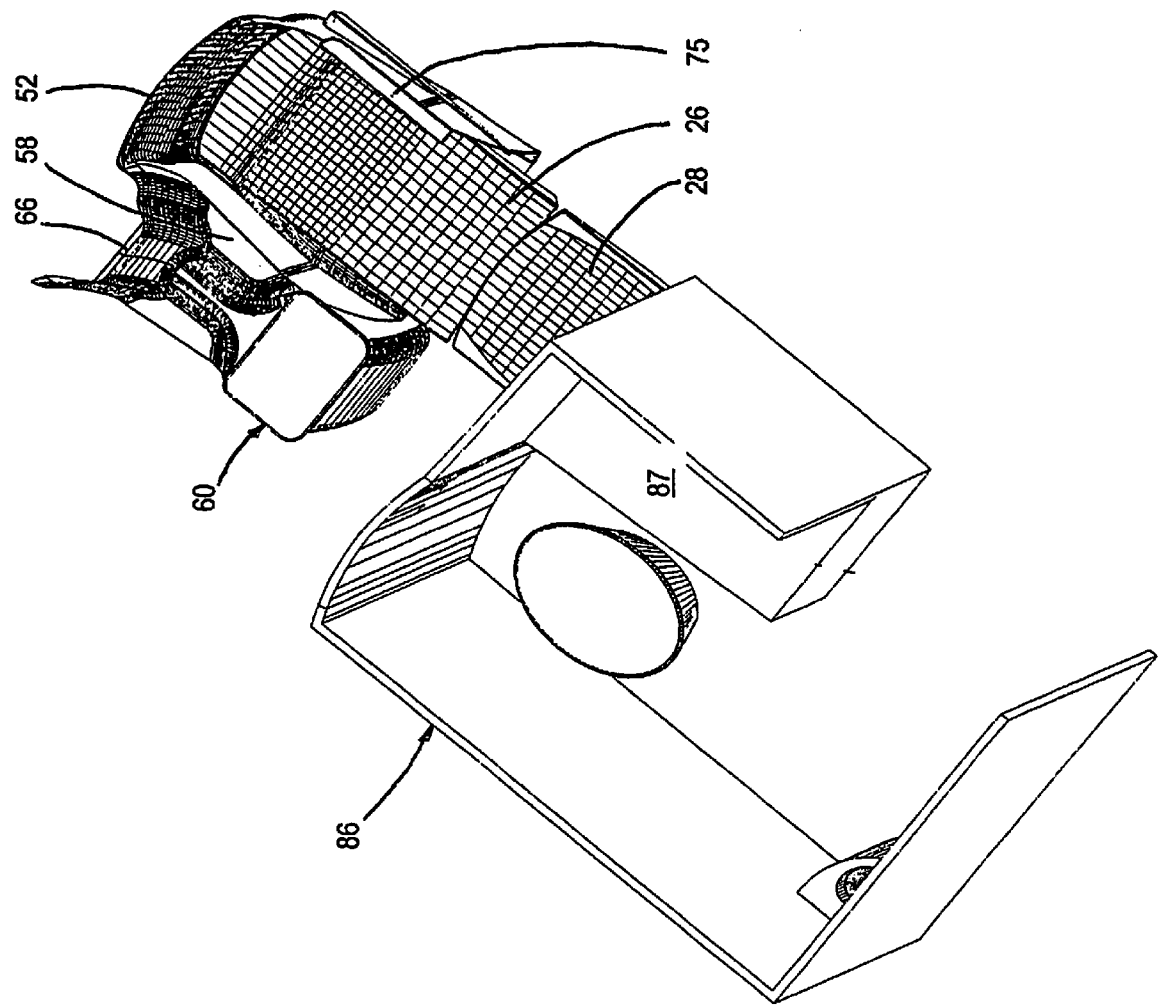
Figure 12:
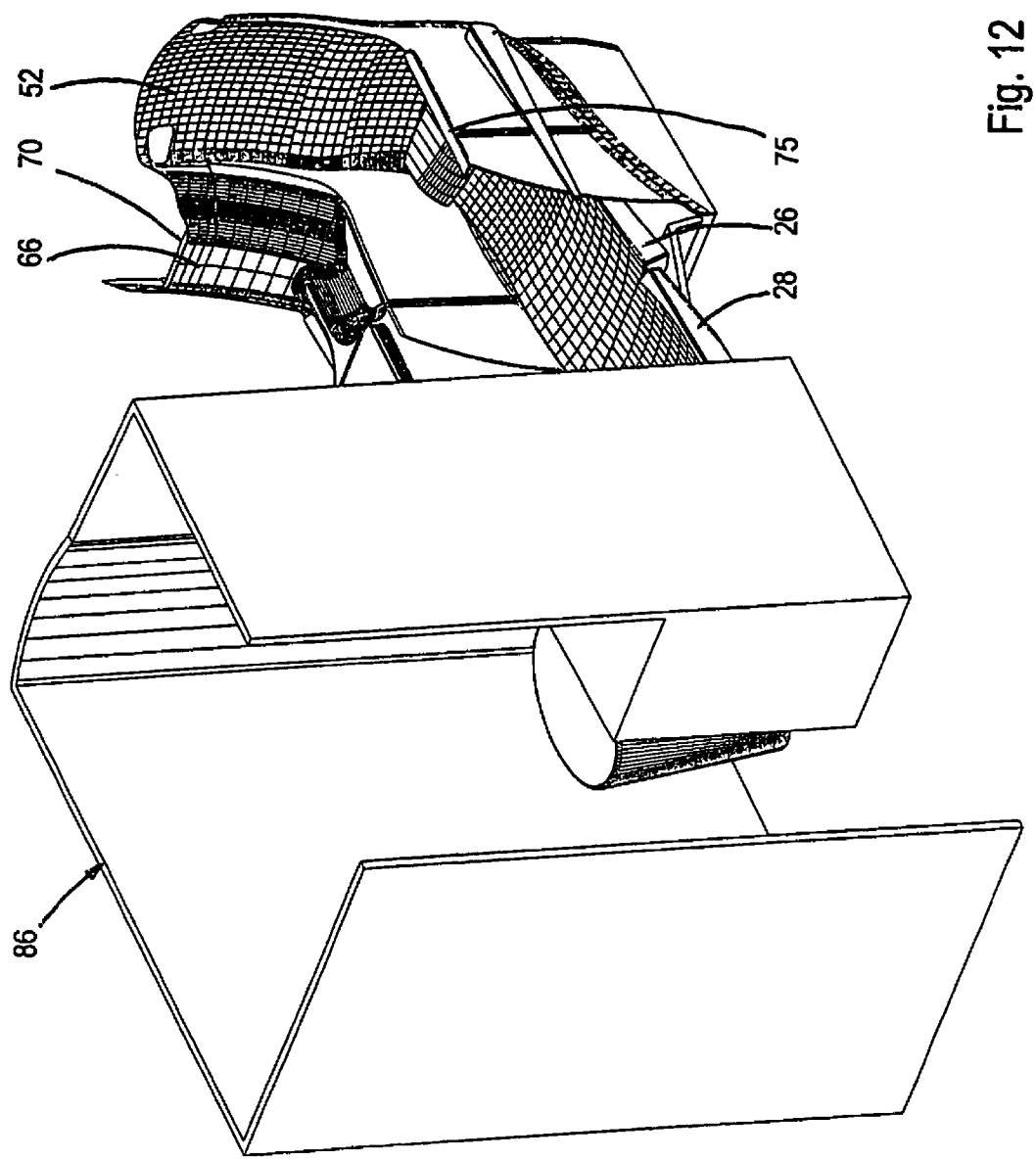

Likewise, when a front row approaches a lavatory enclosure, as labelled 'A' in FIGS. 1 and 2, or a store cupboard, particular measures can be taken to optimise the use of space. FIGS. 10 to 12 are views from various vantage points of one such arrangement with respect to a lavatory enclosure 86 at the front of the outer group 14. Once again, the objective is to minimise the longitudinal distance between a rear bulkhead 88 of the enclosure and the front seat of an adjacent block of seats.

As with the galley, a recess 90 is formed in the bulkhead 88 to provide a footwell. The corresponding abutment within the lavatory enclosure 86 has a top surface 87 that can provide a table-top surface for a person within the enclosure. Alternatively, the space above the abutment may be enclosed for use as stowage space or housing for equipment.

At the rear of a group, the seat can be mounted close to a bulkhead since, in the preferred embodiment, no extra space is needed to allow the seat to recline. If there is sufficient space to gain access to it, the unused rear footwell may provide additional storage space.

Figure 14:
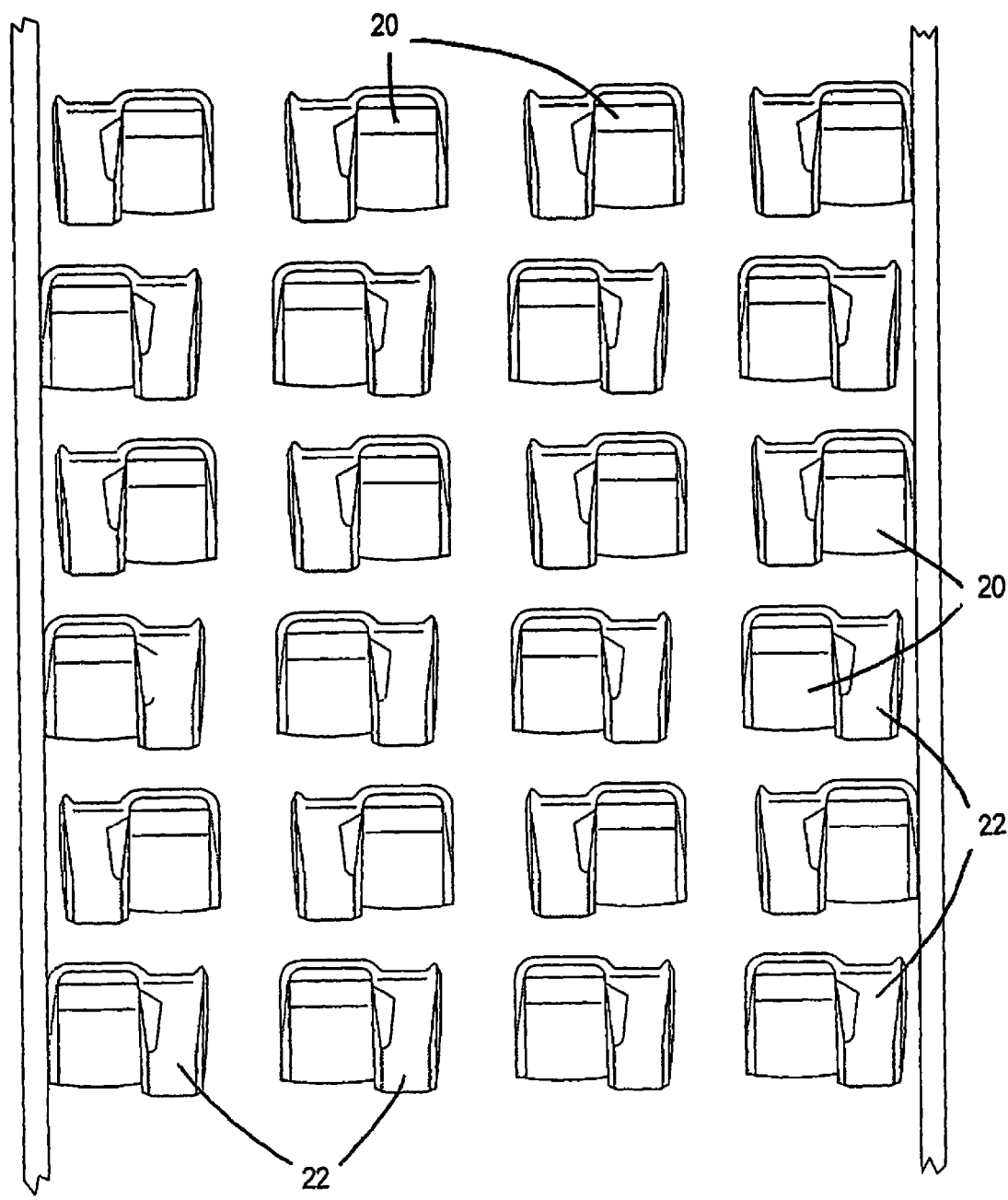
FIGS. 14 to 19 illustrate respective alternative seating plans comprising seating arrangements embodying the invention.

FIGS. 14 to 18 show, by way of example, respective alternative seating layouts (only part of the respective cabins are shown), the layouts being comprised of seating assemblies or components described herein before. FIG. 14 shows a 3 aisle seating layout wherein, in each row, there is only one seat 20 and adjacent footwell 22 (or buttress 56) between each aisle. The layout of FIG. 14 is suitable for, for example, Airbus A380 and A340 (r.t.m) aircraft or for Boeing B777 and B747 (r.t.m) aircraft. In the following examples, it will be seen that the seats 20 in alternate rows are staggered in a transverse direction with respect to one another, while seats 20 in every other row are substantially in register with one another in the transverse direction (i.e. lie on a common longitudinal axis).

Figure 15:
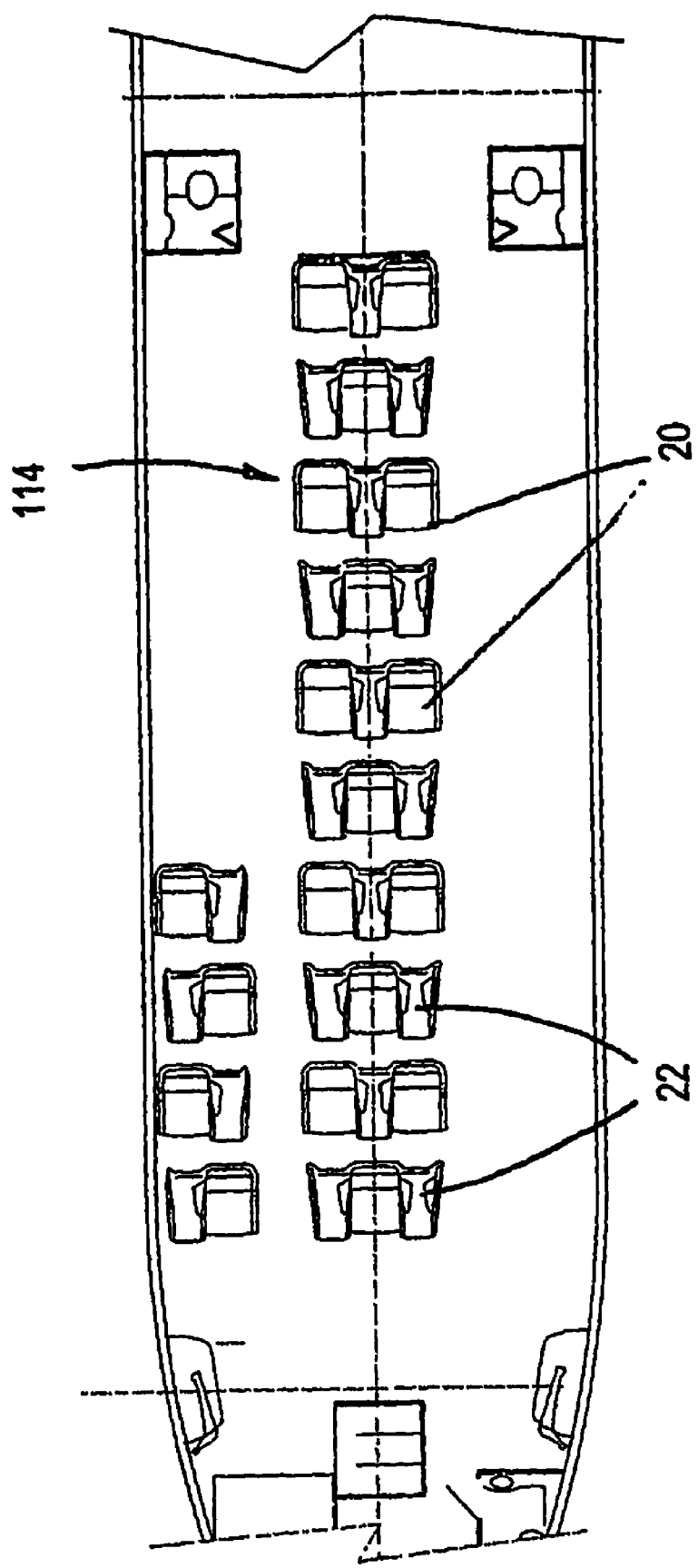

FIG. 15 shows a 2 aisle seating layout that is generally similar to the layout of FIG. 1, except that the central group 114 of seats 20 comprises, in alternate rows, a respective seating component comprising one seat 20 with an adjacent footwell 22 (or buttress 56) on either side, and then two seats 20 with a common adjacent footwell 22 (or buttress 56) in between the seats 20, the seats 20 in successive rows being staggered in the transverse direction in the manner illustrated above. The layout of FIG. 15 is suitable for use in, for example, Boeing B767 (r.t.m) aircraft.

Figure 16:
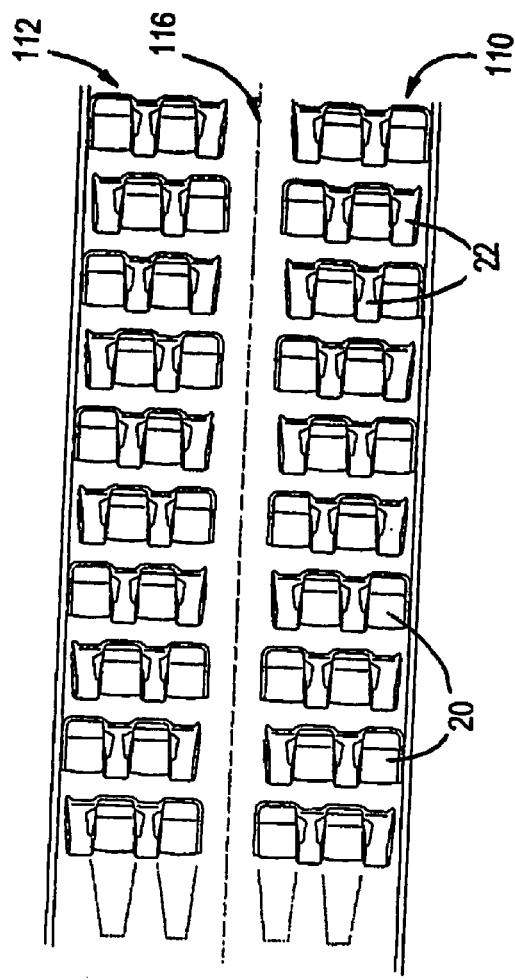

FIG. 16 shows a single aisle layout comprising two seating groups 110, 112, one on either side of the aisle 116. Each row of each group 110, 112 comprises two seats 20 each having a respective adjacent footwell 22 (or buttress 56), the seats 20 in successive rows being staggered in the transverse direction. The layout of FIG. 16 is suitable for use in, for example, Boeing B767-200 (r.t.m) and Airbus A340 (r.t.m) aircraft.

Figure 17:
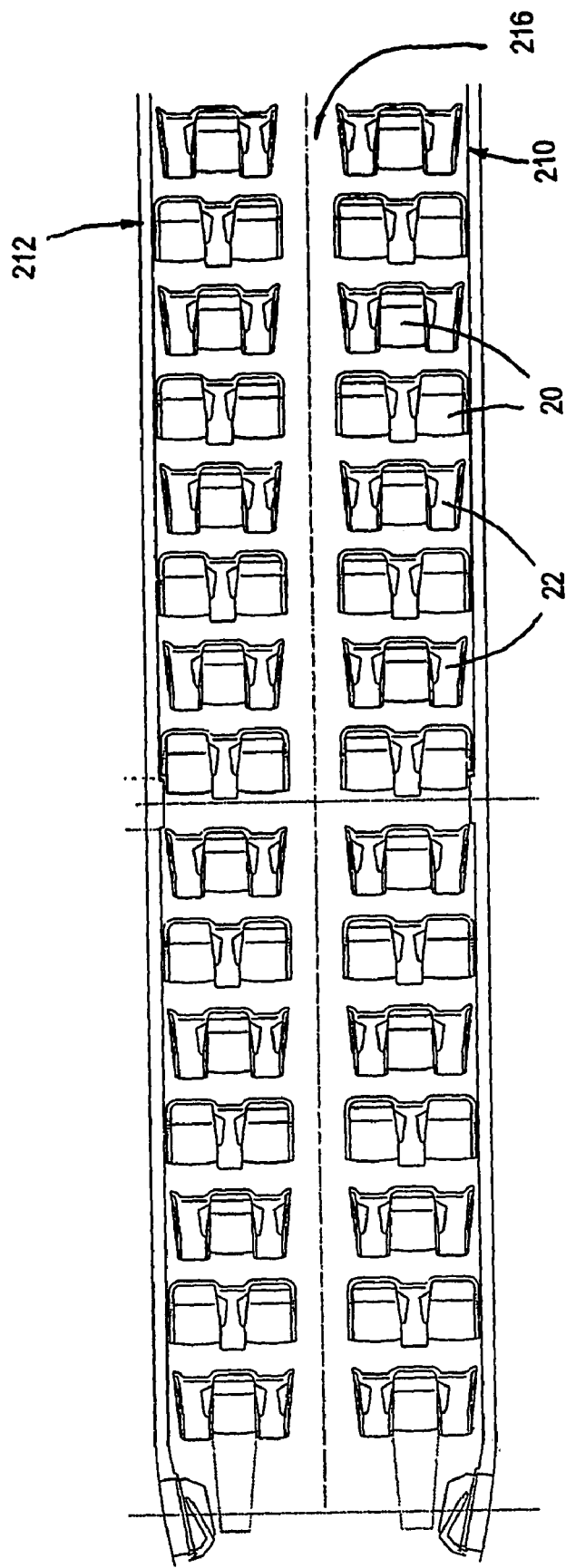

FIG. 17 shows a single aisle layout comprising two seating groups 210, 212, one on either side of the aisle 216. Alternate rows of each group 210, 212, comprise one seat 20 with an adjacent footwell 22 (or buttress 56) on either side, and then two seats 20 with a common adjacent footwell 22 (or buttress 56) in between the seats 20, the seats 20 in successive rows being staggered in the transverse direction. The layout of FIG. 17 is suitable for use in, for example, Boeing B737 (r.t.m) and Airbus A319 (r.t.m) aircraft.

Figure 18:
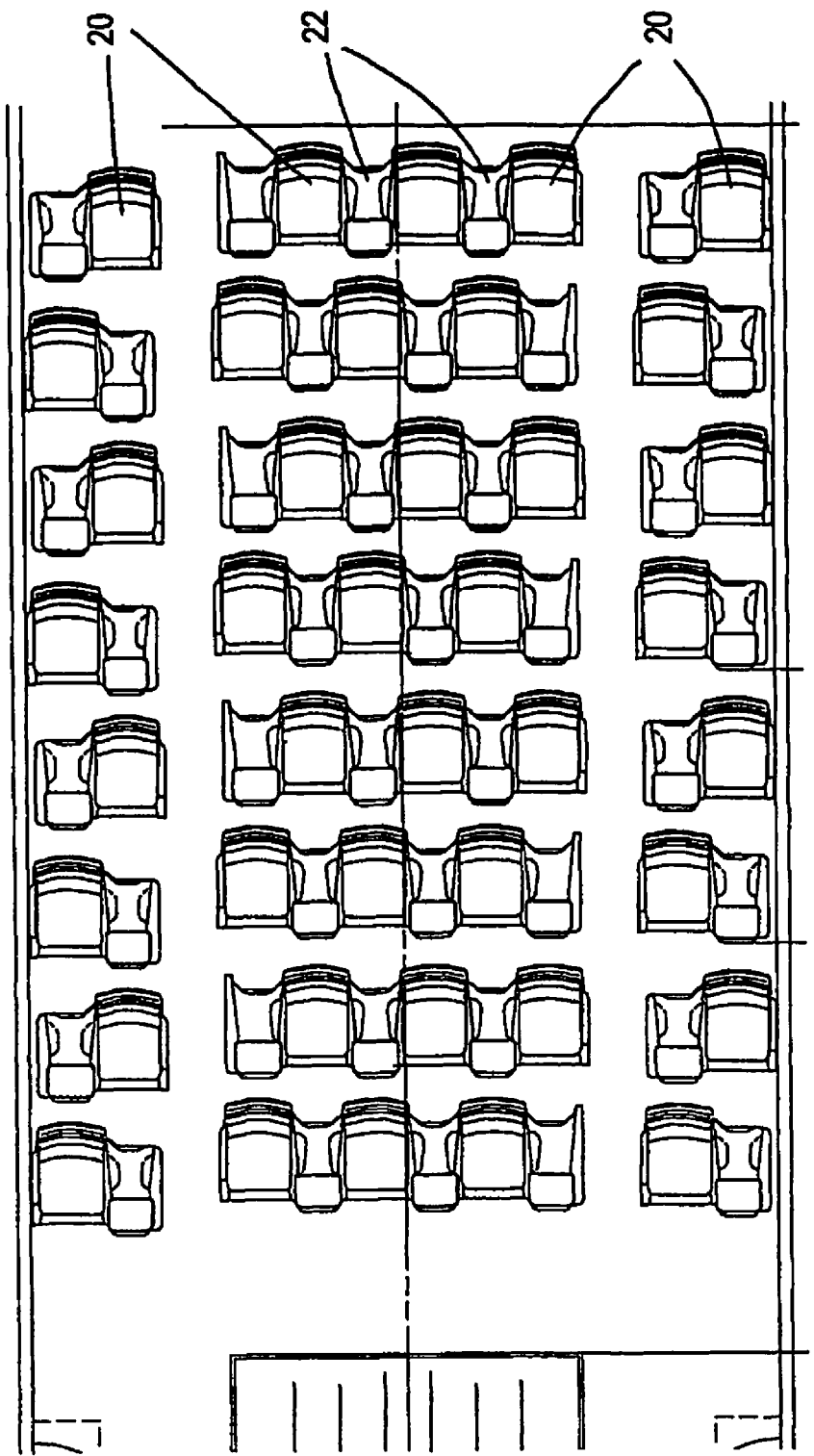

FIG. 18 shows a 2 aisle layout in which each row of each seating group comprises 3 seats 20, or seating positions, each seat having a respective adjacent footwell 22/buttress, the seats 20 in successive rows being staggered in the transverse direction. Such a layout would be suitable for, for example, a Boeing B777 or B747 (r.t.m) aircraft.

Figure 19:
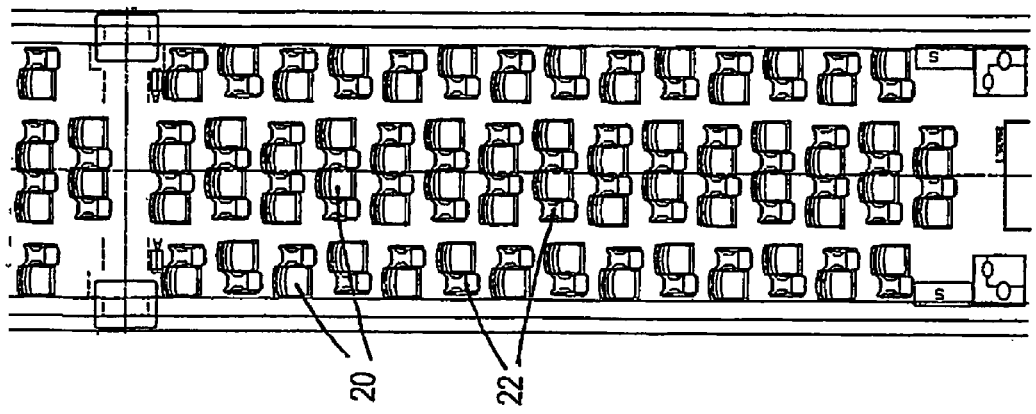

FIG. 19 shows a 2 aisle layout in which each row of each seating group comprises 2 seats 20 (or seating position), each seat 20 having a respective adjacent footwell 22/buttress, the seats 20 in successive rows being staggered in the transverse direction as shown.

It will be noted that in the layouts of FIGS. 14, 15 and 19, each passenger has direct access to an aisle.

Conventionally, 3 seats (usually economy class seats) are sacrificed to install 1 conventional "lie flat at an angle" bed/seat, while 4 seats (usually economy class seats) are sacrificed to install 1 conventional "horizontal" bed. With the present invention, typically about 2.8 seats are sacrificed to install 1 seat 20 with its associated components. In the embodiment of FIG. 16, only 2 seats are sacrificed to install 1 seat 20 with associated components. This is particularly attractive to airline operators who typically demand a "horizontal bed" ticket price that is about ten times that of an economy seat. Moreover, the efficient use of space exhibited by the present invention allows the pitch between rows to be reduced in comparison with conventional layouts to the extent that an additional row of seats can be installed in a given cabin area. A typical conventional seat pitch between rows is around 1500 mm (60 inches) whereas, with the preferred embodiments of the invention, the seat pitch between rows may be between approximately 1000 mm to 1150 mm (40 to 46 inches).

It will be understood that various advantageous aspects of the embodiments described herein may be used independently of other aspects of the embodiments. For example, the overhang of the seating position, or seat station, and adjacent footwell; the overlapping of seating stations of successive rows in the transverse direction; the overhanging armrests 75; the tray 60 location and configuration; and the shape and configuration of the shell 50, may each be employed independently of each other and of other aspects of the invention as will be apparent to a skilled person and are not limited to use in connection with seats that recline into a bed state.

The invention is not limited to the embodiments described herein which may be modified or varied without departing from the scope of the invention.

The invention claimed is:

1. A seating arrangement for a passenger-carrying vehicle, the arrangement providing a plurality of seating positions, said seating positions being capable of simultaneously seating a respective passenger, each of the seating positions comprising a respective seat and a respective footwell, said respective footwell being located forwardly of said respective seat in a forward direction;
   wherein said seating arrangement includes a first of said seating positions and a second of said seating positions displaced with respect to one another in both a forward direction and a transverse direction, said transverse direction being substantially perpendicular to said forward direction such that the respective footwell of said first seating position is located beside the respective seat of said second seating position in said transverse direction, said second seating position being located generally forward of said first seating position in said forward direction;
   wherein said respective footwell of said first seat position includes a top portion enclosing said footwell from above to define a respective console adjacent said respective seat of said second seating position;
   wherein each seat is operable into a reclined state in which a respective component of the respective seat for supporting said respective passenger's legs projects into the respective footwell;
   wherein the said second seating position partially overlaps with the footwell of said first seating position in said transverse direction such that said second seating position overhangs part of the footwell of said first seating position along a side of said footwell; and
   a shell shaped to define a respective station for the respective seats and to define the respective footwells of said first and second seating positions, wherein the station for the seat of the first seating position and the station for the seat of the second seating position partially overlap in the transverse direction such that said station for the seat of the second seating position overhangs the respective footwell of said first seating position, and wherein the shell includes a buttress portion extending adjacent the seat of said second seating position, the buttress portion being shaped to define a respective footwell of said first seating position.

2. A seating arrangement as claimed in claim 1, wherein each seat is associated with at least one armrest, and wherein at least a respective armrest of the first seating position and of the second seating position overlap in the transverse direction.

3. A seating arrangement as claimed in claim 1, wherein said footwells are shaped to become narrower in said forward direction.

4. A seating arrangement as claimed in claim 3, wherein each seating position comprises a respective region for receiving a passenger's arms when lying on the seat in its reclined state, and wherein the respective arm-receiving region of the first seating position and of the second seating position partially overlap in the transverse direction, and wherein at least some of said arm-receiving regions become wider in said forward direction.

5. A seating arrangement as claimed in claim 1 wherein the shell is shaped so that the respective station becomes wider, and the respective footwell becomes correspondingly narrower, in said forward direction.

6. A seating arrangement as claimed in claim 1 wherein the respective seats of the first seating position and of the second seating position partially overlap in the transverse direction, and wherein the seat of the second seating position overhangs part of the footwell of the first seating position.

7. A seating arrangement as claimed in claim 1 wherein each seat includes a back and a base and wherein, when the seats are in the reclined state, the respective backs of the first seating position and of the second seating position partially overlap in the transverse direction, and wherein the back of the seat, when reclined, of the second seating position overhangs part of the footwell of the first seating position.

8. A seating arrangement as claimed in claim 1 wherein each seating position comprises a respective region for receiving a passenger's arms when lying on the seat in its reclined state, and wherein a respective arm-receiving region of the first seating position and of the second seating position partially overlap in the transverse direction, and wherein an arm-receiving region of the second seating position overhangs part of the footwell of the first seating position.

9. A seating arrangement as claimed in claim 1 wherein the footwell of the first seating position becomes narrower in a direction generally away from a ground surface on which the seating arrangement rests during use.

10. A seating arrangement as claimed in claim 9, wherein the footwell of the first seating position narrows at an inflected portion, the inflected portion being located between the leg support component of the seat, when reclined, of the first seating position and the back of the seat, when reclined, of the seat of the second seating position.

11. A seating portion as claimed in claim 1 wherein the shell is shaped so that the respective station becomes wider, and the respective footwell becomes correspondingly narrower, in said direction generally away from the ground surface.

12. A seating arrangement as claimed in claim 1, wherein each seat comprises a back, a seat base and the leg-supporting component and, when moving from an upright state to the reclined state, the back, seat base and leg-supporting component each move in a generally forward direction.

13. A seating arrangement as claimed in claim 1, wherein at least one of said seating positions includes an armrest comprising a shelf overhanging the respective seating position in the transverse direction.

14. A seating arrangement as claimed in claim 13, wherein said shelf overhangs the respective seat.

15. A seating arrangement as claimed in claim 13, wherein, when the seat is in the reclined state, the respective armrest overhangs the back of the respective seat.

16. A seating arrangement as claimed in claim 1, wherein, in the reclined state, each seat provides a respective sleeping surface that is substantially horizontal with the ground surface on which the seating arrangement rests during use.

17. A seating arrangement as claimed in claim 1, wherein the shell is shaped to define a respective station for two or more seats in a row.

18. A seating arrangement as claimed in claim 1, wherein the shell comprises a portion for accommodating the back of a seat, said portion being fixed in a fore-and-aft direction.

19. A seating arrangement as claimed in claim 1 wherein the shell comprises a portion for accommodating a back rest of a seat, said portion being movable in a fore-and-aft direction.

20. A seating arrangement as claimed in claim 1, wherein each console is shaped to define a respective armrest adjacent the respective adjacent seat, the respective armrest overlapping with the footwell beneath the console.

21. A seating arrangement as claimed in claim 1, wherein a table comprising at least one table leaf is associated with each console, the table being deployable from a stowed state in or on the console in which it is disposed generally parallel with the ground surface on which the seating arrangement rests during use.

22. A seating arrangement as claimed in claim 1, wherein each said buttress portion provides said console.

23. A seating arrangement as claimed in claim 22, wherein a table comprising at least one table leaf is associated with each console, the table being deployable from a stowed state in or on the console in which it is disposed generally parallel with the ground surface on which the seating arrangement rests during use, and wherein the buttress portion includes a stowage area for said table.

24. A seating arrangement as claimed in claim 1, wherein the shell is shaped to define a respective generally upright web portion extending between adjacent stations, or adjacent a single seat station.

25. A seating arrangement as claimed in claim 24, wherein said upright web portion includes a surface area disposed in a plane generally perpendicular to the forward direction, and wherein a monitor is carried by said surface area.

26. A seating arrangement as claimed in claim 24, wherein said upright web portion is shaped to provide a screen between passengers seated in adjacent seats.

27. A seating arrangement as claimed in claim 1, wherein the footwell of the first seating position extends beyond the base of the seat, when upright, of the second seating position in the forward direction.

28. A seating arrangement as claimed in claim 1, wherein a plurality of said seating positions are arranged in rows and ranks, the rows being generally perpendicular to the ranks and being partitioned by one or more aisles, the aisles being generally parallel with the ranks.

29. A seating arrangement as claimed in claim 28, comprising two aisles, each row comprising a respective single seating position on the outer side of each aisle, alternate rows comprising two seating positions and then three seating positions between the aisles.

30. A seating arrangement as claimed in claim 28, comprising two aisles, each row comprising a respective single seating position on the outer side of each aisle, alternate rows comprising two seating positions and then one seating position between the aisles.

31. A seating arrangement as claimed in claim 28, comprising two aisles, each row comprising a respective single seating position on the outer side of each aisle, each row comprising two seating positions between the aisles.

32. A seating arrangement as claimed in claim 28, comprising two aisles, each row comprising a respective single seating position on the outer side of each aisle, each row comprising three seating positions between the aisles.

33. A seating arrangement as claimed in claim 28, comprising one aisle, each row comprising a respective two seating positions on either side of the aisle.

34. A seating arrangement as claimed in claim 28, comprising one aisle, alternate rows comprising one seating position and then two seating positions on either side of the aisle.

35. A seating arrangement as claimed in claim 28, comprising three aisles, each row comprising a respective single seating position on both sides of each aisle.

36. A seating arrangement as claimed in claim 1, wherein a platform is provided within each footwell, and wherein, when the associated seat is in the reclined state, the leg-supporting component of the seat closely approaches the platform within the footwell.

37. A seating arrangement as claimed in claim 1, wherein each seating position provides a respective sleeping compartment when the respective seat is in the reclined state, each sleeping compartment comprising the respective footwell and a sleeping surface projecting into the footwell, the sleeping surface comprising the respective seat when in the reclined state, and wherein the sleeping compartment of the first seating position and the sleeping compartment of the second seating position partially overlap in a transverse direction such that the sleeping compartment of the second seating position overhangs part of the footwell of the first seating position.

38. An aircraft comprising a seating arrangement as claimed in claim 1.

39. A seating arrangement as claimed in claim 1, wherein each seat includes a respective back and a respective base and wherein the second seating position includes a region for receiving the base of the seat of the second seating position, said base-receiving region overhanging part of the footwell of the first seating position.

40. A seating arrangement as claimed in claim 39 wherein, when the respective seat of the second seating position is in an upright state, the respective base of the respective seat of the second seating position overhangs the footwall of the first seating position.

41. A seating arrangement as claimed in claim 1, wherein each seat is operable between an upright state and the reclined state, and wherein said second seating position includes a region for receiving a passenger's arms when said passenger is reclined on the seat of said second seating position when in the reclined state, said arm-receiving region overhanging part of the footwell of the first seating position.

42. A seating arrangement as claimed in claim 1, wherein the seat of the second seating position overhangs part of the footwell of the first seating position.

43. A seating arrangement as claimed in claim 1, wherein said vehicle has a floor, and wherein said seats, when in said reclined state, slope downwardly towards said floor in said forward direction.

44. A seating arrangement as claimed in claim 1, wherein each seat includes a back and a base and each seating position includes a respective region for receiving the base of the respective seat, and wherein said seat base-receiving region of said second seating position overhangs part of the footwell of said first seating position along a side of said footwell.

45. A seating arrangement for a passenger-carrying vehicle, the arrangement providing a plurality of seating positions, said seating positions being capable of simultaneously seating a respective passenger, each of the seating positions comprising a respective seat and a respective footwell, said respective footwell being located forwardly of said respective seat in a forward direction;
- wherein said seating arrangement includes a first of said seating positions and a second of said seating positions displaced with respect to one another in both a forward direction and a transverse direction, said transverse direction being substantially perpendicular to said forward direction such that the respective footwell of said first seating position is located beside the respective seat of said second seating position in said transverse direction, said second seating position being located generally forward of said first seating position in said forward direction;
- wherein said respective footwell of said first seat position includes a top portion enclosing said footwell from above to define a respective console adjacent said respective seat of said second seating position;
- wherein each seat is operable into a reclined state in which a respective component of the respective seat for supporting said respective passenger's legs projects into the respective footwell;
- wherein the said second seating position partially overlaps with the footwell of said first seating position in said transverse direction such that said second seating position overhangs part of the footwell of said first seating position along a side of said footwell;
- wherein at least one of said seating positions includes an armrest comprising a shelf overhanging the respective seating position in the transverse direction; and
- a shell shaped to define a respective station for at least one of said seats and to define a respective footwell on at least one side of the respective station, wherein the station for the seat of the first seating position and the station for the seat of the second seating position partially overlap in the transverse direction, and wherein said armrests are fixed with respect to the shell.

46. A seating arrangement for a passenger-carrying vehicle, the arrangement providing a plurality of sleeping compartments, each sleeping compartment comprising a respective footwell and a respective sleeping surface projecting into the respective footwell;
- wherein each sleeping compartment includes a region for receiving a passenger's arms when lying on his back on the respective sleeping surface;
- wherein said seating arrangement includes a first of said sleeping compartments and a second of said sleeping compartments displaced with respect to one another in both a forward direction and a transverse direction, said transverse direction being substantially perpendicular to said forward direction such that the respective footwell of said first sleeping compartment is located beside the respective sleeping surface of said second sleeping compartment in said transverse direction, the second sleeping compartment being located generally forward of the first sleeping compartment in said forward direction;
- wherein the second sleeping compartment partially overlaps with the footwell of the first sleeping compartment in said transverse direction such that said arm-receiving region of the second sleeping compartment overhangs part of the footwell of the first sleeping compartment along a side of said footwell; and
- a shell shaped to define a respective station for the first and second sleeping compartments, wherein the station for the first sleeping compartment and the station for the second sleeping compartment partially overlap in the transverse direction such that said arm-receiving region of the second sleeping compartment overhangs the respective footwell of said first sleeping compartment, and wherein the shell includes a buttress portion extending adjacent the arm-receiving region of said second sleeping compartment, the buttress portion being shaped to define the respective footwell of said first sleeping compartment.

47. A seating arrangement as claimed in claim 46, wherein said vehicle has a floor, and wherein said sleeping surfaces slope downwardly towards said floor in said forward direction.

48. A seating arrangement for a passenger-carrying vehicle, the arrangement providing a plurality of seating positions, said seating positions being capable of simultaneously seating a respective passenger, each seating position comprising a respective seat and a respective footwell, said respective footwell being located forward of said respective seat in a forward direction;
- wherein each seat includes a back and a base and each seating position includes a respective region for receiving the base of the respective seat;
- wherein said seating arrangement includes a first of said seating positions and a second of said seating positions displaced with respect to one another in both a forward direction and a transverse direction, said transverse direction being substantially perpendicular to said forward direction, such that the respective footwell of said first seating position is located beside the seat of said second seating position in said transverse direction, said second seating position being located generally forward of said first seating position in said forward direction;
- wherein said second seating position partially overlaps with the respective footwell of said first seating position in said transverse direction such that said seat base-receiving region of said second seating position overhangs part of the footwell of said first seating position along a side of said footwell; and
- a shell shaped to define a respective station for the respective seats and to define the respective footwells of said first and second seating positions, wherein the station for the seat of the first seating position and the station for the seat of the second seating position partially overlap in the transverse direction such that said station for the seat of the second seating position overhangs the respective footwell of said first seating position, and wherein the shell includes a buttress portion extending adjacent the seat of the second seating position, the buttress portion being shaped to define the respective footwell of said first seating position.

49. A seating arrangement as claimed in claim 48 wherein, when the seat of the second seating position is in an upright state, the base of the seat of the second seating position overhangs the footwall of the first seating position.

50. A seating arrangement as claimed in claim 48, wherein each seat is operable between an upright state and the reclined state, and wherein said second seating position includes a region for receiving a passenger's arms when said passenger is reclined on the seat of said second seating position when in the reclined state, said arm-receiving region overhanging part of the footwell of the first seating position.

51. A seating arrangement as claimed in claim 48, wherein the seat of the second seating position overhangs part of the footwell of the first seating position.

52. A seating arrangement as claimed in claim 48, wherein said respective footwell of said first seating position includes a top portion enclosing said footwell from above to define a respective console adjacent said respective seat of said second seating position.

* * * * *